(12) United States Patent
Balakrishnan et al.

(10) Patent No.: US 11,443,273 B2
(45) Date of Patent: Sep. 13, 2022

(54) ARTIFICIAL INTELLIGENCE FOR COMPLIANCE SIMPLIFICATION IN CROSS-BORDER LOGISTICS

(71) Applicant: Hearst Magazine Media, Inc., New York, NY (US)

(72) Inventors: Ramanan Balakrishnan, Bengaluru (IN); Abishekaa Kulamarva Yajnakumara, Bengaluru (IN); Govind Chandrasekhar, Bengaluru (IN); Raj Bhandari, Mountain View, CA (US); Asmit Kumar, Bengaluru (IN); Dinesh Kumar Nalluri, Bengaluru (IN); Srinivasan Kidambi Sridharan, Bengaluru (IN); Vinoth Gopinathan, San Francisco, CA (US); Varun Sivamani, San Francisco, CA (US)

(73) Assignee: Hearst Magazine Media, Inc., New York, NY (US)

( * ) Notice: Subject to any disclaimer, the term of this patent is extended or adjusted under 35 U.S.C. 154(b) by 394 days.

(21) Appl. No.: 16/740,301

(22) Filed: Jan. 10, 2020

(65) Prior Publication Data
US 2020/0151663 A1 May 14, 2020

(51) Int. Cl.
*G06Q 30/00* (2012.01)
*G06Q 10/08* (2012.01)
(Continued)

(52) U.S. Cl.
CPC .......... *G06Q 10/0838* (2013.01); *G06F 7/14* (2013.01); *G06F 16/254* (2019.01);
(Continued)

(58) Field of Classification Search
CPC .......... G06Q 10/0838; G06Q 10/0831; G06N 20/00; G06F 16/258; G06F 16/254; G06F 7/14
(Continued)

(56) References Cited

U.S. PATENT DOCUMENTS 6,523,019 B1 * 2/2003 Borthwick ............. G06N 20/00
 706/45
7,558,778 B2 * 7/2009 Carus ..................... G06N 20/00
 707/999.003
(Continued)

OTHER PUBLICATIONS

Zonos Classify "Automate HS Code Classification", 14 pages, May 13, 2020.

*Primary Examiner* — Pavan Mamillapalli
(74) *Attorney, Agent, or Firm* — Knobbe, Martens, Olson & Bear LLP

(57) ABSTRACT

Methods, systems, and apparatus, including computer programs encoded on computer storage media, for artificial intelligence for compliance simplification in cross-border logistics. A computer system and method may be used to infer product information. A computer system may feed a product data record into a machine learning (ML) models to identify a predictive attribute(s) that corresponds with identifying accurate product information. The computer system may feed the product data record and the predictive attribute into a ML model(s) to estimate additional data for the product data record. The computer system may update the product data record with the estimated additional data. The computer system may predict product code data by feeding the updated product data record into an ensemble of ML models, the product code data based on one or more commerce classification code taxonomies.

22 Claims, 21 Drawing Sheets

(51) Int. Cl.
    *G06F 16/25*         (2019.01)
    *G06N 20/00*         (2019.01)
    *G06F 7/14*          (2006.01)

(52) U.S. Cl.
    CPC ........... *G06F 16/258* (2019.01); *G06N 20/00* (2019.01); *G06Q 10/0831* (2013.01)

(58) Field of Classification Search
    USPC ........................................................ 705/341
    See application file for complete search history.

(56) References Cited

U.S. PATENT DOCUMENTS

| | | | |
|---|---|---|---|
| 7,689,527 B2 * | 3/2010 | Pavlov | G06F 16/90344 706/45 |
| 8,122,026 B1 * | 2/2012 | Laroco, Jr | G06F 16/93 707/730 |
| 9,049,117 B1 | 6/2015 | Nucci | |
| 9,870,629 B2 | 1/2018 | Cardno | |
| 2003/0088458 A1 * | 5/2003 | Afeyan | G06F 30/00 706/13 |
| 2003/0217052 A1 * | 11/2003 | Rubenczyk | G06F 16/951 707/E17.058 |
| 2004/0225624 A1 * | 11/2004 | Reynolds | G06Q 20/204 705/401 |
| 2007/0282900 A1 * | 12/2007 | Owens | G06F 16/2465 |
| 2008/0243905 A1 * | 10/2008 | Pavlov | G06F 16/90344 707/999.102 |
| 2009/0012842 A1 | 1/2009 | Srinivasan | |
| 2009/0119268 A1 | 5/2009 | Bandaru | |
| 2010/0138712 A1 * | 6/2010 | Lee | G06F 11/0763 714/E11.023 |
| 2011/0320414 A1 | 12/2011 | Sim | |
| 2012/0203708 A1 * | 8/2012 | Psota | G06Q 30/06 705/347 |
| 2012/0272160 A1 | 10/2012 | Spivack | |
| 2013/0110594 A1 | 5/2013 | Sinyagin | |
| 2014/0114758 A1 | 4/2014 | Bentley | |
| 2014/0149105 A1 | 5/2014 | Lamba | |
| 2014/0358828 A1 * | 12/2014 | Phillipps | G06N 20/00 706/12 |
| 2015/0170055 A1 * | 6/2015 | Beymer | G06N 20/00 706/12 |
| 2015/0332369 A1 | 11/2015 | Nakane | |
| 2016/0224938 A1 * | 8/2016 | Shah | G06Q 10/083 |
| 2016/0357408 A1 | 12/2016 | Zavar | |
| 2017/0046763 A1 | 2/2017 | Pan | |
| 2017/0302627 A1 | 10/2017 | Lai | |
| 2018/0013720 A1 | 1/2018 | Sachdev | |
| 2018/0137560 A1 | 5/2018 | Chopra | |
| 2019/0043095 A1 | 2/2019 | Grimaud | |
| 2019/0095973 A1 | 3/2019 | Byron | |
| 2019/0197063 A1 * | 6/2019 | Sekar | G06N 3/006 |
| 2019/0220694 A1 | 7/2019 | Biswas | |
| 2020/0151201 A1 * | 5/2020 | Chandrasekhar | G06N 5/022 |

* cited by examiner

ARTIFICIAL INTELLIGENCE FOR COMPLIANCE SIMPLIFICATION IN CROSS-BORDER LOGISTICS

BACKGROUND

Websites host a large variety of products that can be purchased. Some of the products have multiple attributes that may apply to a single product, such as size and color. It would be desirable to be able to collect information about products and their attributes on the web in an automated fashion to develop an advantageous dataset containing information about the many products in the world.

SUMMARY

Described herein are methods, systems, and apparatus, including computer programs encoded on computer storage media, for artificial intelligence for compliance simplification in cross-border logistics.

In general, one innovative aspect of disclosed embodiments includes a computer system, computer-implemented method, and non-transitory computer-readable medium having instructions for inferring information about a product. A computer system feeds a product data record into one or more machine learning (ML) models to identify at least one predictive attribute that corresponds with identifying accurate product information. The computer system feeds the product data record and the predictive attribute into the one or more machine learning models to estimate additional data for one or more null fields in the product data record. The product data records are updated with the estimated additional data. The computer system predicts product code data by feeding the updated product data record into an ensemble of one or more ML models, where the product code data based on one or more commerce classification code taxonomies.

In general, another innovative aspect of disclosed embodiments includes a computer system, computer-implemented method, and non-transitory computer-readable medium having instructions for inferring information about a product. A computer system retrieves at least one product data attribute based on a formatting convention of input data. The computer system augments the input data with the retrieved product data attribute for a product data record. The computer system ranks historical product data records in historical shipment information that satisfy a similarity threshold with the product data record. The product data is fed into one or more machine learning (ML) models to identify at least one predictive attribute that corresponds with identifying accurate product information. The product data record, the ranked historical product data records and the predictive attribute are merged to generate predictor data. The predictor data is fed into one or more ML models to estimate additional data for one or more null fields in the product data record. The product data record is updated with the predicted additional data to generate an enriched product data record. The enriched product data record is fed into an ensemble of one or more ML models to predict product code data based on one or more commerce classification code taxonomies. And the computer system adds the predicted product code data to the enriched product data record.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
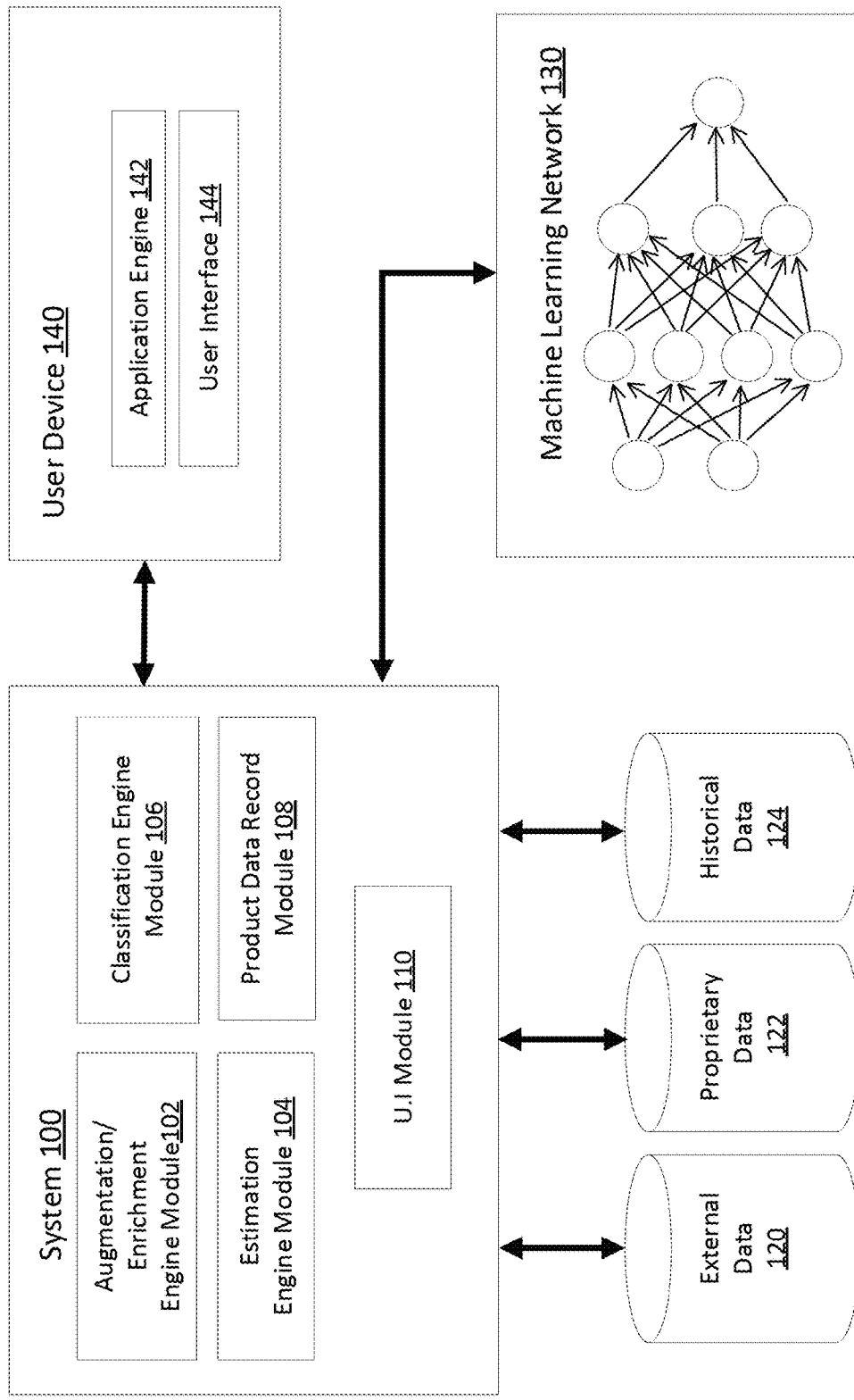
FIG. 1A illustrates an example environment in which embodiments of the invention may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Disclosed embodiments relate to a method and system for a Predictor that infers product information. Product input data may be incomplete with respect to all the types of information required for a compliant transaction. For example, shipping the same product to different international destinations may require a different set of product data per different destination, such as multiple, but different, compliant bills of lading. The Predictor utilizes machine learning techniques to predict and estimate product information that is absent from the product input data.

In one embodiment, the Predictor may feed a product data record into a machine learning (ML) models to identify a predictive attribute(s) that corresponds with identifying accurate product information. The Predictor may feed the product data record and the predictive attribute into a ML model(s) to estimate additional data for the product data record. The Predictor may update the product data record with the estimated additional data. The Predictor may predict product code data by feeding the updated product data record into an ensemble of ML models, the product code data based on one or more commerce classification code taxonomies.

In one embodiment, initial input product data may be received by the Predictor that may be incomplete with respect to information that may be required to ship the product to various destination. For example, shipment of a product to multiple cross-border destinations may require a different set of product information per destination while the initial input product data may be minimal. The Predictor performs various operations to retrieve, estimate and predict additional information for a product data record that corresponds with the initial input product data. Various data sources may be accessed by the Predictor to search for and identify product attributes. Various machine learning models may be implemented by the Predictor to identify, estimate and predict additional product data. The identified product attributes and the estimated and predicted additional product data may be incorporated by the Predictor into the product data record.

As shown in FIG. 1A, an example system 100 of the Predictor may include an augmentation/enrichment engine module 102, and estimation engine module 104, a classification engine module 106, a product data record module 108 and a user interface (U.I.) module 110. The system 100 may communicate with a user device 140 to display output, via a user interface 144 generated by an application engine 142. A machine learning network 130 and one or more databases 120, 122, 124 may further be components of the system 100 as well.

Figure 1B:
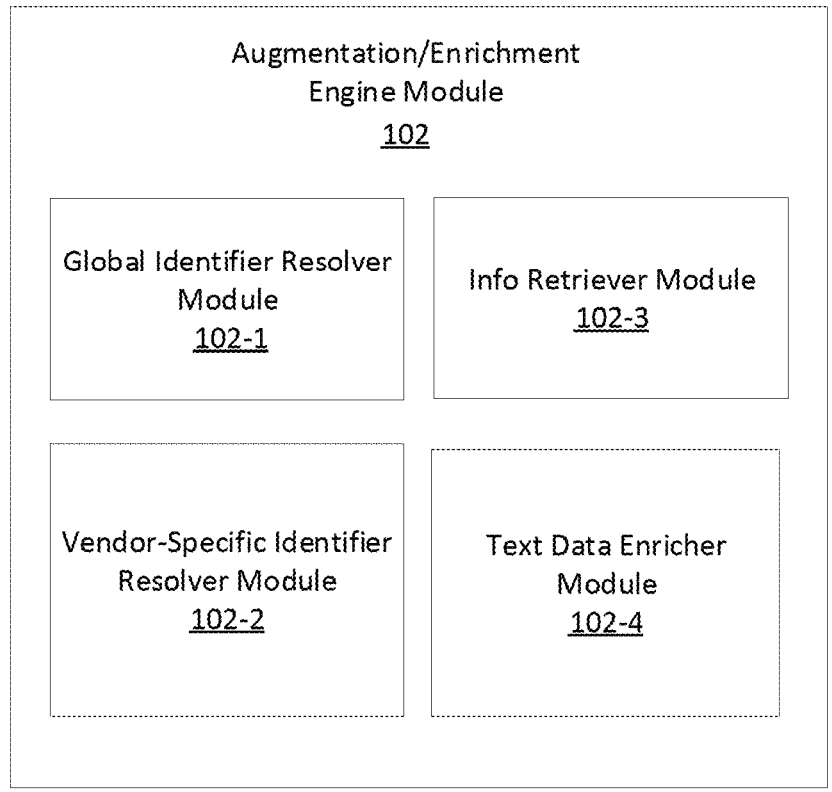
FIGS. 1B-1C illustrate diagrams of example components of one or embodiments.

The augmentation/enrichment engine module 102 of the system 100 may perform functionality as illustrated in FIG. 1D, FIGS. 2A-2C, FIG. 3, FIGS. 7A-7B and FIGS. 8-10. As shown in FIG. 1B, the augmentation/enrichment engine module 102 includes a global identifier resolver module 102-1, a vendor-specific identifier resolver module 102-2, and information retriever module 102-3 and a text data enricher module 102-4.

Figure 1C:
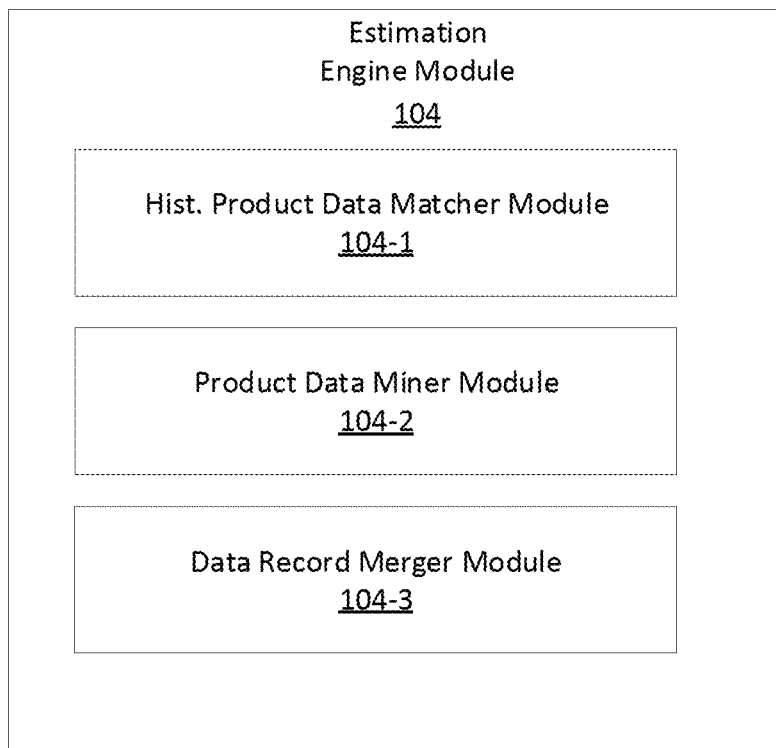

The estimation engine module 104 of the system 100 may perform functionality as illustrated in FIG. 1D, FIGS. 2A-2B, FIGS. 2D-2E, FIG. 4 and FIGS. 11-13. As shown in FIG. 1C, the estimate engine module 104 may include an historical product data matcher module 104-1, a product data miner module 104-2 and a data record merger module 104-3.

The classification module 106 of the system 100 may perform functionality as illustrated in FIG. 1D, FIGS. 2A-2B and FIG. 5.

The product data record module 108 of the system 100 may perform functionality as illustrated in FIG. 1D, FIGS. 2A-2B, FIGS. 2D-2E and FIGS. 3-5.

The user interface (U.I.) module 110 of the system 100 may perform any functionality with respect to causing display of any output, data and information of the system 100 to the user interface 144.

While the databases 120, 122 and 124 are displayed separately, the databases and information maintained in a database may be combined together or further separated in a manner the promotes retrieval and storage efficiency and/or data security.

Figure 1D:
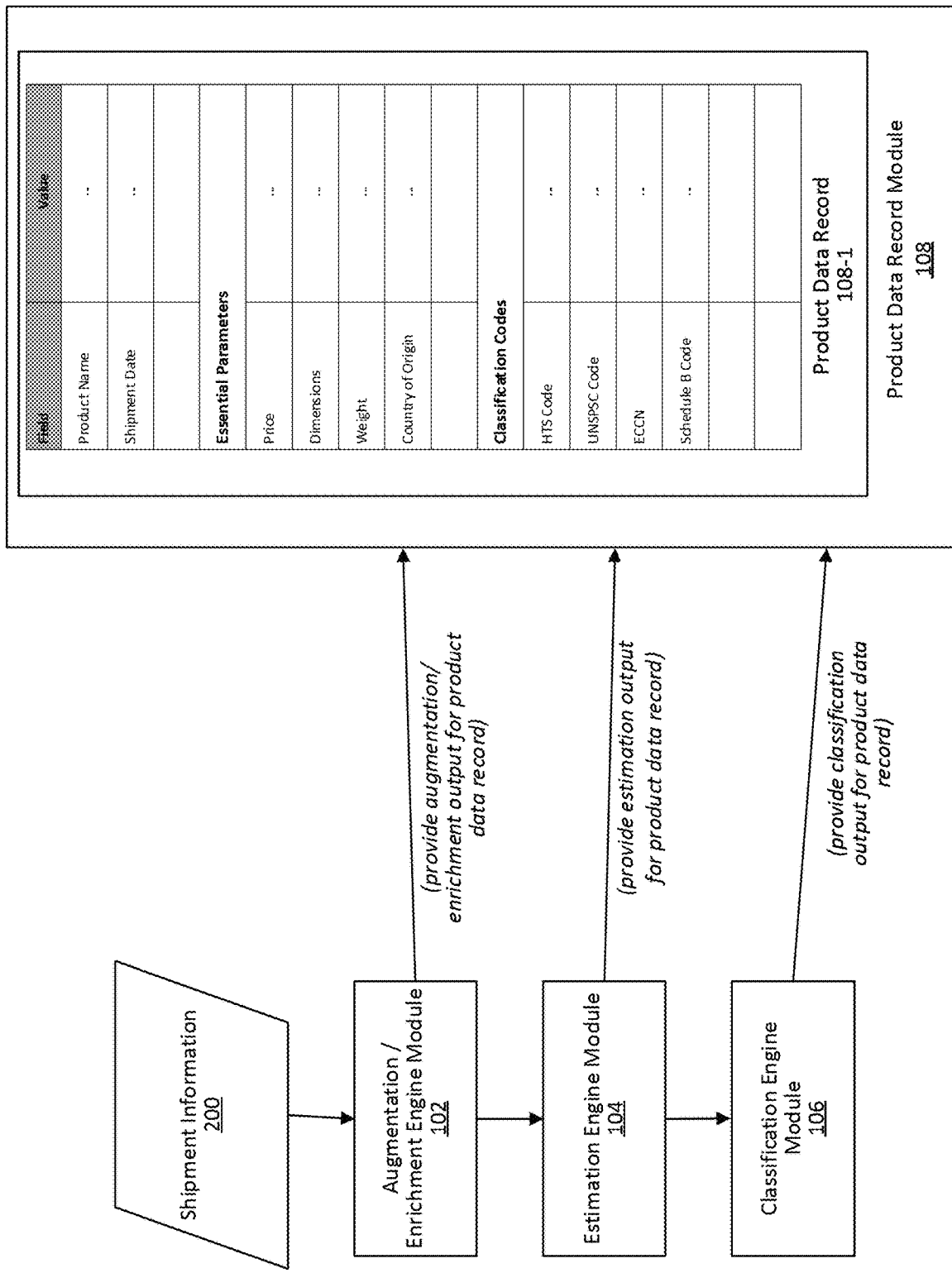
FIG. 1D illustrates an example dataflow for one or more embodiments.

As shown in FIG. 1D, input product data may be shipment information 200 that includes information for shipping a product to one or more destinations. The shipment information may be received by the augmentation/enrichment module 102 and output of the module 102 will be made available for a product data record 108-1 in the product data record module 108 as well as the estimation engine module 104 and the classification engine module 106. Output of the estimation engine module 104 will also be made available for the product data record 108-1 and the classification engine module 106. The product data record 108-1 may also be populated with output from the classification engine module 106. In one embodiment, the output of the modules 102, 104, 106 may be merged and resolved by the product data record module 108 in order to eliminate data redundancies by selecting output data for the product data record 108-1 with a highest confidence score.

Figure 2A:
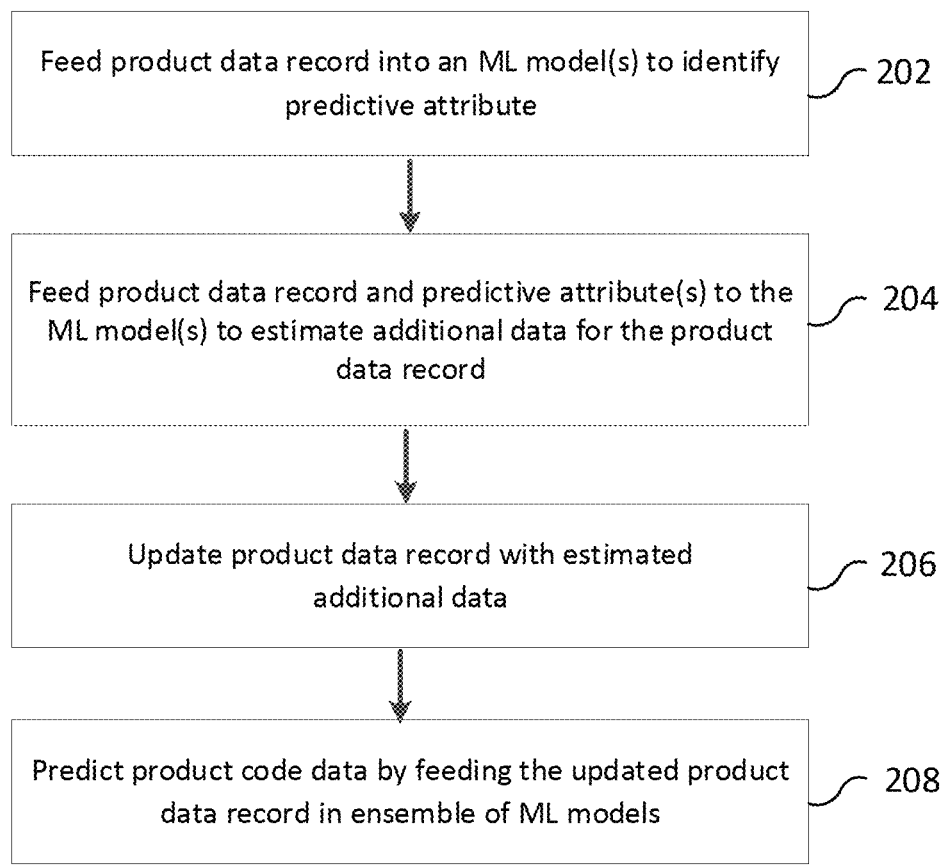
FIGS. 2A-2E illustrate example methods of one or embodiments.

As shown in the example method 200 of FIG. 2A, the Predictor feeds a product data record into one or more ML models to identify at least one predictive attribute that corresponds with identifying accurate product information (Act 202). For example, the augmentation/enrichment module 102 generates an augmented product data record that includes additional product data attributes collected by the module 102 based on input product data, such as incomplete product shipment information. For example, product data attributes may include price, dimensions, shipping weight, product code, product identifier, brand, country of origin, shipping destination, technical feature description, etc. The attributes may also be specific given a category of products, such as gender, material, composition, size, wash instructions, fit, style, or theme for the product category of jeans. The estimation engine module 104 identifies historical shipping information similar to the augmented product data record to sends both to one or more ML models that return the predictive attribute(s).

The Predictor feeds the product data record and the predictive attribute into the one or more ML models to estimate additional data for one or more null fields in the product data record (Act 204). The estimation engine module 104 combines historical shipping information, the augmented product data record the predictive attribute(s) into a merged record. The estimation engine module 104 feeds the merged record to the one or more ML models to identify ML parameters that represent data fields in the augmented product data record that must be filled in order to generate compliant shipping information. The one or more ML models further provide estimated data values for the output ML parameters. The Predictor updates the product data record with the estimated additional data (Act 206). For example, the estimation engine module 104 generates an enriched product data record by inserting the estimated data values for the ML parameter into the augmented product data record.

The Predictor predicts product code data by feeding the updated product data record into an ensemble of one or more ML models (Act 208). For example, the classification engine module 106 receives the enriched product data record as input and feeds the enriched product data record into an ensemble of ML models. The ensemble of ML model generates a predicted product code that is formatted according to an established classification code taxonomy.

Figure 2B:
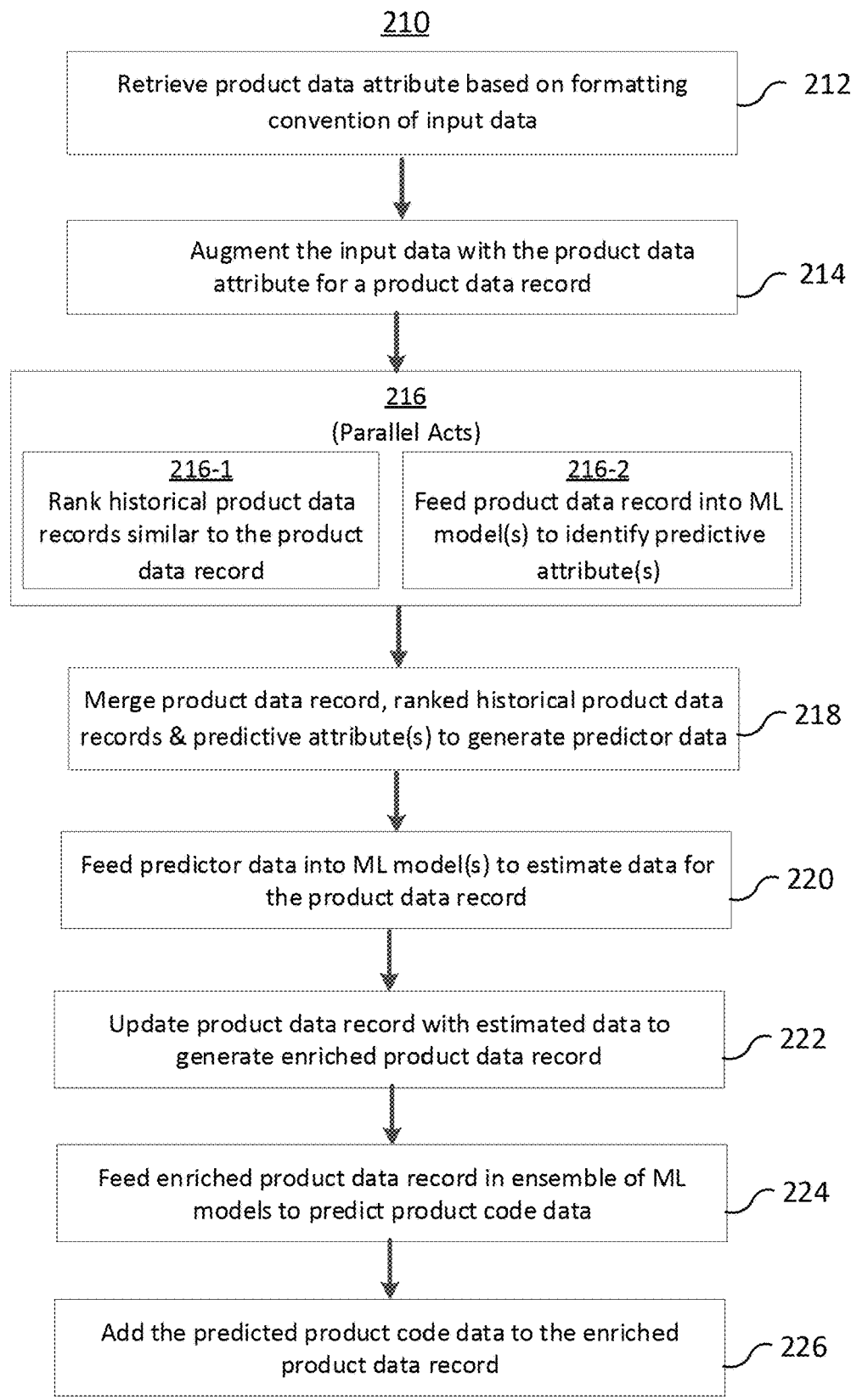

As shown in the example method 210 of FIG. 2B, the Predictor retrieves a product data attribute(s) based on a formatting convention of the input data (Act 212). For example, various formatting conventions for product identifications are pre-defined and well known, such as Universal Product Codes (UPC), European Article Numbers (EAN) and Amazon Standard Identification Number (ASIN). By identifying a portion of the input data that is structured according to a formatting convention, the Predictor may determine which data sources to search for more product data attributes or may perform a search based on the portion of the input data that is structured according to a formatting convention. The Predictor augments the input data with the retrieved product data attributes for a product data record that corresponds with a product described by the input data (Act 214).

Act 216 includes parallel acts 216-1 and 216-2. However, the acts 216-1, 216-2 may be performed sequentially. The Predictor ranks historical product data records in historical shipment information that satisfy a similarity threshold with the product data record (Act 216-1). For example, the historical product data records may have details about previously shipped products, such as price, dimensions, shipping weight, country of origin and destination, etc. The Predictor selects historical product data records that meet a threshold for an amount of product data that matches the augmented product data record, thereby increasing a likelihood that a historical product data record may include product information that was required for a compliant shipping of the same product. Similarity scores are calculated for the historical product data records that satisfy the threshold and the historical product data records are ranked accordingly. Similarity scores between two products can be calculated using a variety of techniques. One approach is to count the number of attributes identical between the two (or more) products. For each identical attribute, the total of number possible values is summed up to represent the similarity score for that attribute. For example, the attribute "material" can have 100 different possible values. Two products having an identical value of "material: Cotton", will contribute a value of 100 towards the similarity score, to indicate a strong signal of similarity. By this method, an attribute with lower number of possible values, will contribute lesser towards the similarity. The attribute-level similarity scores can be summed and normalized across products by weighting them against a curated importance list of each attribute to that product. Another approach to calculate the similarity score between two products is to use a machine learning model(s) to convert each product to a vectorized representation of weights. By representing each product as a vector, the dot product between the products can be used as a similarity score between them—also referred to as the cosine similarity score between two products. A number of vectorization techniques can be used for this approach, including popular deep learning vectorization methods such as Word2Vec, GloVe or fastText.

The Predictor feeds the product data record into one or more machine learning (ML) models to identify at least one predictive attribute that corresponds with identifying accurate product information (Act 216-2). For example, the Predictor may feed the augmented product data record into a machine learning model trained for named entity recognition ("NER") to isolate important attributes. That is, if the product data record has the name of the product, the NER model may isolate (or select) a machine learning variable that maps to product names as a variable that is highly likely to facilitate one or more ML models in predicting accurate product information. In contrast, if the product data record has no product name, but does have product weight, the NER model may not isolate a machine learning variable that maps to product weights as a variable, unless the product has an exceptionally unique weight and that weight value is present in multiple historical product data records.

The Predictor merges the product data record, the ranked historical product data records and the predictive attribute to generate predictor data (Act 218). The Predictor creates a merged record that is formatted such that the data in the merged record's field aligns with one or more ML parameters. During the merging process, the original product data record is designed as the primary value for each attribute of the product. The attributes from the ranked historical product data records are appended as a respective secondary value for each attribute. Each product ends up with multiple values against each of its attributes, as per the attribute availability in the historical product data records. Such formatting requires the Predictor add metadata in the merged record. For example, metadata may describe the origin (e.g. input data, augmented data, historical data) of a value in a data field. A confidence score(s) for data in the merged record may be included as well. One embodiment may assign confidence scores is to calculate a similarity score between the product data record and the historical product data record and use the calculated similarity score as the confidence score for each secondary attribute value. Another embodiment may use to the number of times a historical product data record has been seen as a measure of confidence.

The Predictor feeds the predictor data into the one or more ML models to estimate additional data for one or more null fields in the product data record (Act 220). For example, the Predictor feeds a merged record into one or more ML models to estimate data about the product that should be in the product data record given all the various types of data in the merged record. For example, if the merged record has formatted data based on the product's brand and weight, the one or more ML models may estimate additional product specifications (e.g. height, dimensions). A classification model may estimate categorial parameters of the product, such as country of origin, if the product data record lacks such information. A logistic regression model may also estimate continuous parameters, such as weight, if the product data record lacks such information. The Predictor updates the product data record with the predicted additional data to generate an enriched product data record (Act 222).

The Predictor feeds the enriched product data record into an ensemble of the one or more ML models to predict a product code data for the product (Act 224). A product code may be based on one or more commerce classification code taxonomies developed by governments and international agencies per regulatory requirements, such as Harmonized System (HS) code, Harmonized Tariff System (HTS) code, Export Control Classification Number (ECCN) code, Schedule B code, or United Nations Standard Products and Services Code (UNSPSC). The ensemble of ML models for predicting the product code may include multiple machine learning techniques, such as: logistic regression, random forests, gradient boosting, as well as modern deep learning techniques, such as convolutional neural networks (CNNs), bi-directional long-short term memory (LSTM) networks and transformer networks. The Predictor adds the predicted product code data to the enriched product data record (Act 226).

Figure 2C:
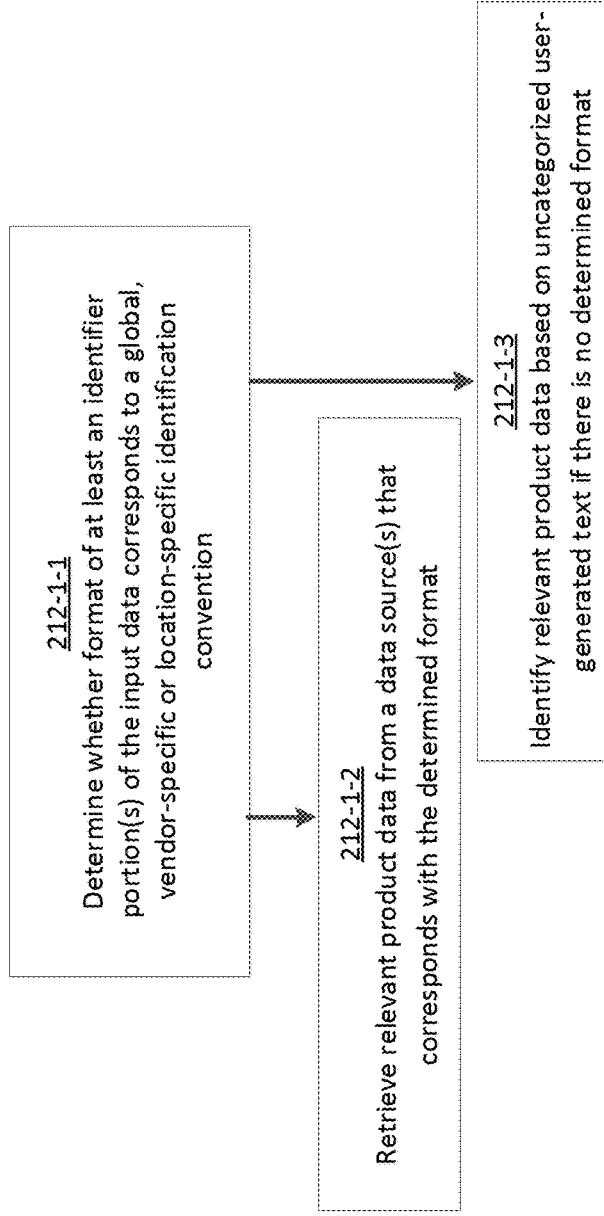

An example method 212-1 for retrieving product data attribute(s) based on a formatting convention of input data in shown in FIG. 2C. The Predictor determines whether the format of an identifier portion of the input data corresponds to a global, vendor-specific or location-specification identification convention (Act 212-1-1). For example, the Predictor determines whether the input data, or part of the input data, is formatted according to a known product identification system that is commonly known. A global convention may be Universal Product Codes (UPCs), European Article Numbers (EANs), International Standard Book Number or Global Trade Item Numbers (GTINs). A vendor-specific convention may be Manufacturer Part Numbers (MPN), Stock-Keeping Units (SKUs) or Amazon Standard Identification Number (ASIN). A location-specific convention may be a Uniform Resource Locator (URL).

The Predictor retrieves relevant product data from a data source(s) that corresponds with the determined format (Act 212-1-2). If a global convention has been detected in the input data, the Predictor accesses various types of databases to perform searches with the input data since search query that is a product's UPC, for example, is likely to return search results that provide relevant product data that can be added to the product data record. If a vendor-specific convention has been detected in the input data, the Predictor accesses various types of databases (external, local, proprietary) to perform searches with the input data since search query that is a product's SKU, for example, is likely to return search results that provide relevant product data that can be added to the product data record. If a location-specific convention has been detected in the input data, the Predictor accesses the URL to crawl, parse, identify, extract and format product information from a webpage(s).

The Predictor may determine that the input data does not conform to any type of formatting convention. In such a case, the Predictor identifies relevant product data based on uncategorized user-generated text if there is not determine format (Act 212-1-3). For example, when the input data is user-generated text input, it usually contains some information to directly describe the product being shipped. Depending on the availability and specificity of the text input provided, the user-generated text input may be sufficient to completely describe the product and thereby can be used to populate the product data record. In another example, if the user-generated text input may include the words " . . . mobile phone . . . " and part of a product barcode. The Predictor can use "mobile phone" and the incomplete barcode to find information online or data values from historical shipment records of mobile phones.

Figure 2D:
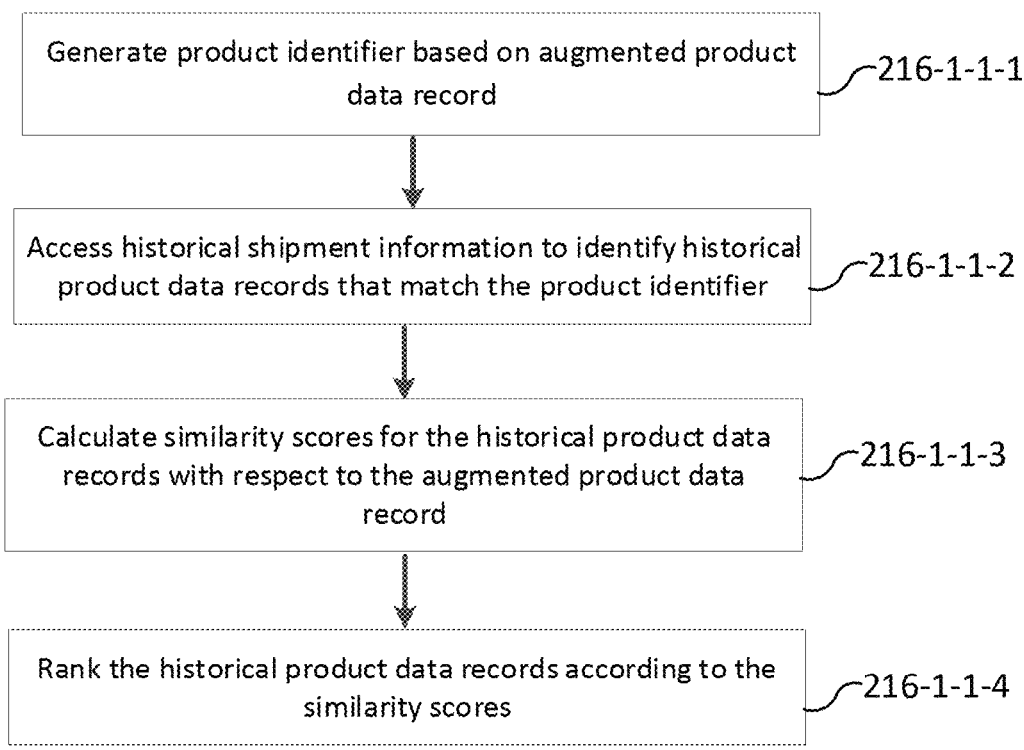

An example method 216-1-1 for ranking historical product data records is shown in FIG. 2D, generating at least one product identifier based on the augmented product data record (Act 216-1-1-1). A variety of techniques may be employed by one or more embodiments to isolate product identifiers from the augment product record. An embodiment may store a table of common identifier paradigms and their associated patterns and then compare pieces of text from the augmented product data record against each pattern. For example, one or more 13-digit numeric strings in the product record are possible EANs (international article number), which can be confirmed by verifying the checksum digit coded in the EAN standard. Similarly, UPCs, GTINs (global trade identification number) and ASINs (amazon standard identification number) may also be formulated as specific regular expressions (regexes) which can be pattern matched against strings from the augmented product data record. To begin estimation of additional product data for shipment of the product, the Predictor accesses historical shipment information to identify historical product data records that include one or more fields that match the product identifier (Act 216-1-1-2). For example, the Predictor compares data fields in historical product data records ("historical records") in historical shipment information to identify historical records with data that is similar to the augmented product data record. The Predictor calculates a respective similarity score for each identify historical product data record with respect to the augmented product data record (Act 216-1-1-3). The Predictor ranked the identified historical product data records according to the respective similarity scores. (Act 216-1-1-4). The Predictor may also feed the augmented product data record into an ML model trained for named entity recognition (NER) to identify a predictive attribute(s) that corresponds with identifying accurate product information.

Figure 2E:
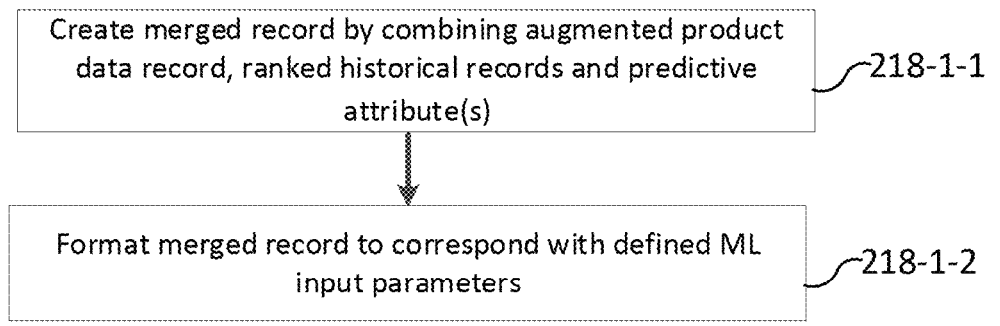

An example method 218-1 for merging a product data record, ranked historical product data records and a predictive attribute(s) is shown in FIG. 2E. The Predictor generates a merged record according to a meaningful and usable format for various ML models to estimate additional product data. The Predictor creates the merged record by combining the augmented product data record, the ranked historical product data records and the predictive attribute (Act 218-1-1). The Predictor formats the merged record to correspond with one or more defined ML input parameters (Act 218-1-2). An example of an ML input parameter may be a respective source metadata for the data in one or more fields (field data) of the merged record. The source metadata indicates the source of a corresponding data value (e.g. input data, historical data, online data, database data, etc.). An example of an ML input parameter may be a respective confidence score corresponding to an accuracy of a data value in the merged record. Another ML input parameter may be a record similarity score based on a comparison of the merged record and the input data. The Predictor feeds the formatted merged record into various ML models, which may return output that includes one or more ML parameters identified as being required for compliance as well as estimated product data for those ML parameters. In one embodiment, the ML parameters and estimated product data may replace null data fields in the product data record.

Figure 3:
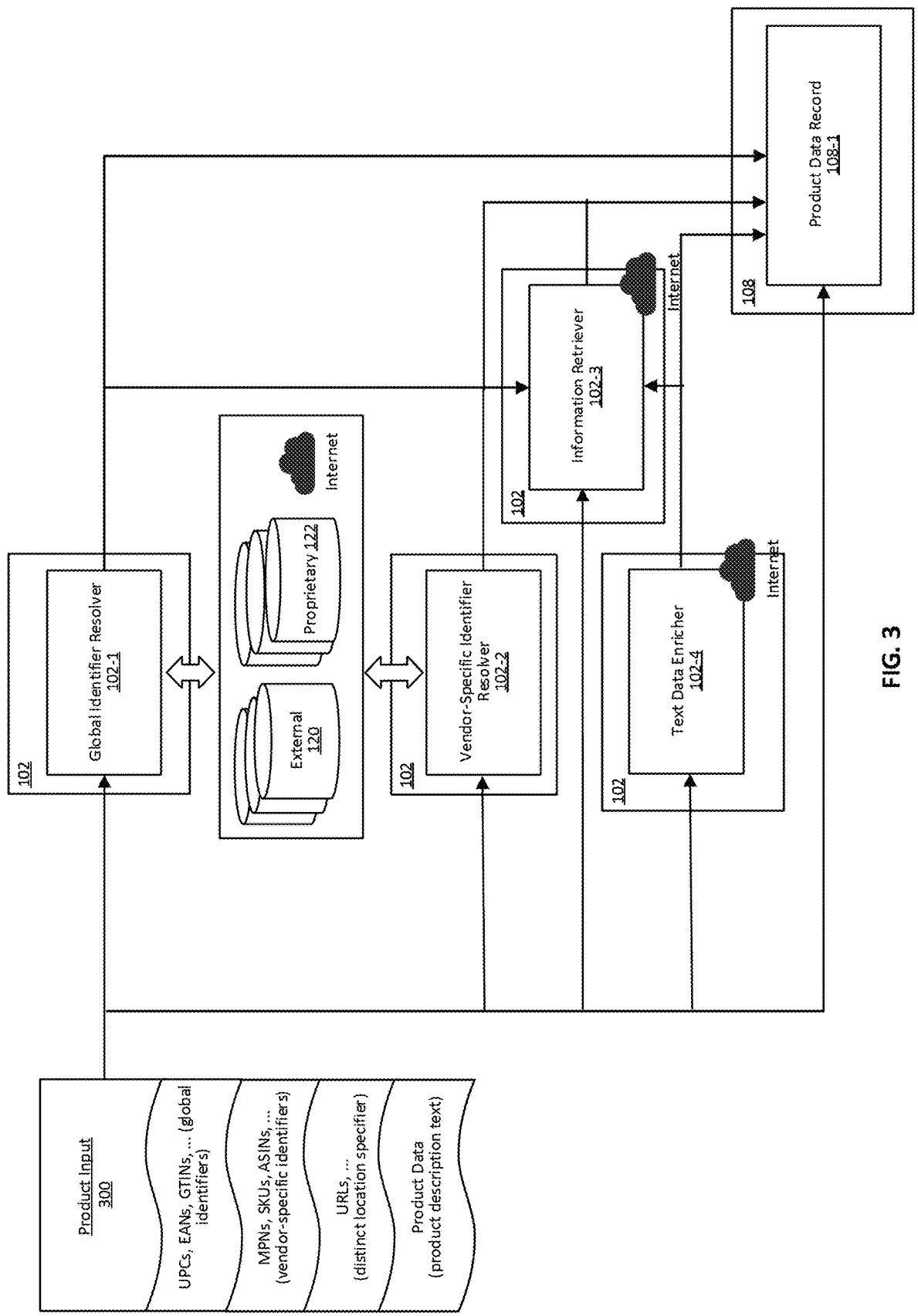
FIG. 3 is an example diagram of one or more embodiments.

As shown in FIG. 3, the global identifier resolver module 102-1 identifies and disambiguates a list of global identifiers in the product input data 300 and associates the identifiers with a corresponding formatting convention. If a formatting convention is not identified for an identifier, the global identifier resolver module 102-1 may indicate that identifier to be invalid (e.g. spam) or the product input data 300 may be handled by the vendor-specific identifier resolver module ("vendor module") 102-2, the information retriever module ("retriever module") 102-3, and/or the text data enricher module ("enricher module") 102-4.

The global identifier resolver module ("global module") 102-1 uses the detected formatting convention and the identifier to access locally maintained proprietary databases. If matching information is found in the databases, the global module 102-1 determines whether the matching information is itself available product data. If so, the global module 102-1 augments the product data record 108-1 with the available product data. If the matching information is, instead, an indication of a data source (such as a URL), the global identifier resolver module 102 may then send the matching information to the information retriever module 102-3.

If no matching information is found by the global module 102-1 in the locally maintained proprietary databases, the global module 102-1 may trigger a failover lookup by accessing one or more third party databases that store information in relation to data similar to the identifier. If matching information is found, it will be sent to the product data record 108-1 (along with the product input data 300) if it is directly available product data, it will be sent to the information retriever module 102-3 if it also is an indication of a data source. If no matching information is found by the failover lookup of the third-party databases, the global module 102-1 may send the product input data 300, the identifier and the determined formatting convention to the enricher module 102-4.

The vendor module 102-2 identifies and disambiguates a list of vendor specific identifiers in the product input data 300 and associates the identifiers with one or more corresponding sources, such as a manufacturer, online marketplace or a seller website. If a source is not identified for an identifier, the vendor module 102-2 may discard that identifier. If a source is identified, the vendor module 102-2 accesses the online location described by the identified source. If the online location is accessible, the vendor module 102-2 mines and queries the online location based on the identifier. If product data is directly available as a result of the mining and querying, the vendor module 102-2 sends the product data and the product input data 300 to the product data record 108-1.

If the source is not accessible, the vendor module 102-2 may query one or more web search engines based on the source and the identifier. If matching information is returned in search result and is directly available product data, then the vendor module 102-2 sends the product data to the product data record 108-1. If no product data is available by way of the search results, the vendor module 102-2 sends the source and the identifier to the retriever module 102-3. If no matching information is returned by the search, the vendor module 102-2 may discard the identifier and the identified source.

The retriever module 102-3 may receive information, either from the product input data 300 or other modules 102-1, 102-2, that indicates a data source of information where additional product information may be available. The retriever module 102-3 accesses the data source and performs context extraction as described by U.S. patent application Ser. No. 16/288,059. For example, the retriever module 102-3 may crawl a website to identify product pages. The product pages may be scraped by the retriever module 102-3 to obtain product data. Moreover, one or more interactive elements on the product pages may be automatically activated to be able to identify the various attribute variations available for the product, such as size and color. The products, attributes, and attribute values may be extracted and normalized and stored. Such extraction by the retriever module 102-3 may be based, for example, on meta-tags, DOM structure, computer vision. If the extraction returns product data, the retriever module 102-3 sends the extracted product data to the product data record 108-1 along with the product input data 300.

The enricher module 102-4 may determine that the product input data 300 is uncategorized, user-generate text, and thereby was not handled by the other modules 102-1, 102-2, 102-3. For example, the product input data 300 may be partial, unstructured or an incomplete text description of the product. The enricher module 102-4 may send the product input data's 300 text as-is to the machine learning network 130 to train one or more machine learning models or to receive machine learning output that estimates and predicts product information. In addition, the enricher module 102-4 may parse the product input data 300 and identify tags (i.e. text portions that represent product information). If the tags describe a data source, the enricher module 102-4 sends the tags to the retriever module 102-3. If the tags describe product identifiers, the enricher module 102-4 sends the tags to the global module 102-1 and the vendor module 102-2.

Figure 4:
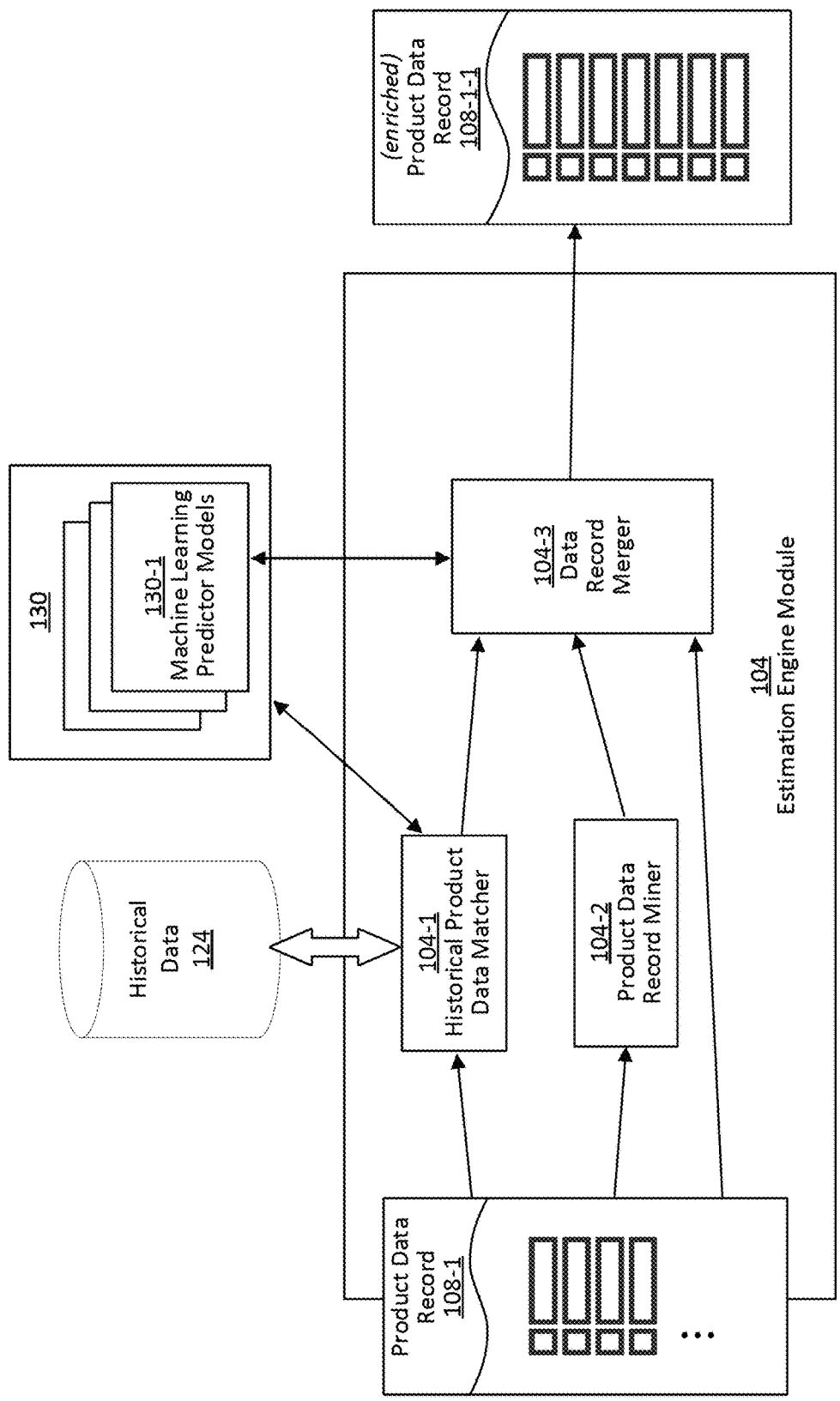
FIG. 4 is an example diagram of one or more embodiments.

As shown in FIG. 4, the estimation engine module 104 receives the product data record 108-1, which may be an augmented product data record based on the input product data 300 and output of the augmentation/enrichment module 102. The output of the augmentation/enrichment module 102 that populates the augmented product data record may be one or more product attributes based on product data returned from the global module 102-1, the vendor module 102-2, the retriever module 102-3 and the enricher module 102-4.

The historical product data matcher module ("historical module") 104-1 isolates product identifiers present in the product data record 108-1. The historical module 104-1 then accesses a database 124 of historical product data to identify previous shipment records. The historical module 104-1 searches through the identified shipment records to extract one or more historical product data records that include a threshold amount of product information that matches the product data record 108-1. The historical module 104-1 calculates a similarity score for each extracted historical product data records and generates a list of the historical product data records ranked according to the respective similarity scores. The historical module 104-1 sends the ranked historical product data records to the data record merger module ("merger module") 104-3.

The product data miner module ("miner module") 104-2 may execute in parallel with the historical module 104-1. The miner module 104-2 mines the product data record 108-1 for one or more predictive attributes that correspond with identifying accurate product information. To do so, the miner module 104-2 sends at least a portion of the product data record 108-1 to one or more machine learning models in the machine learning network 130. The machine learning models return a predictive attribute(s) and the miner module 104-2 sends the predictive attribute(s) to the merger module 104-3.

The merger module 104-3 receives the product data record 108-1, the ranked historical product data records and the predictive attribute(s). A comparison of data fields across the ranked historical product data records and the product data record 108-1 is performed to based on a merger of the historical product records with the actual input product data record. For data fields common between the product data record 108-1 and each respective historical product data records, the merger module 104-3 prioritizes use of the data fields from the input product data record. For data fields present only in the historical product data records, the merger module 104-3 compares the values available across the various historical product data records and picks a value available from the highest ranked historical product data record. Picking the available value from the highest ranked historical product data record ensures that one value is prioritized when conflicting data field values might be amongst different historical product data records. The merger module 104-3 generates a merged record based on the product data record 108-1, the ranked historical product data records and the predictive attribute(s), such that the merged record is formatted according to machine learning parameters so that the merged record can be used as input to one or more ML models. Such formatting may include adding metadata about each field in the product data record 108-1, such as data indicating the data source of the value in the corresponding field. The formatting may include a confidence score for data in one or more fields.

The merger module 104-3 feeds the formatted merged record into one or more ML predictor models 130-1 in the machine learning network 130. Output from the ML predictor models 130-1 may include one or more required ML parameters and estimated data values for the output ML parameters. The ML parameters may map to null data fields in the data product record 108-1 which must be populated in order to form compliant shipping information for the product. The merger module 104-3 adds the one or more required ML parameters and estimated data values to the product data record 108-1 to create an enriched product data record 108-1-1.

Figure 5:
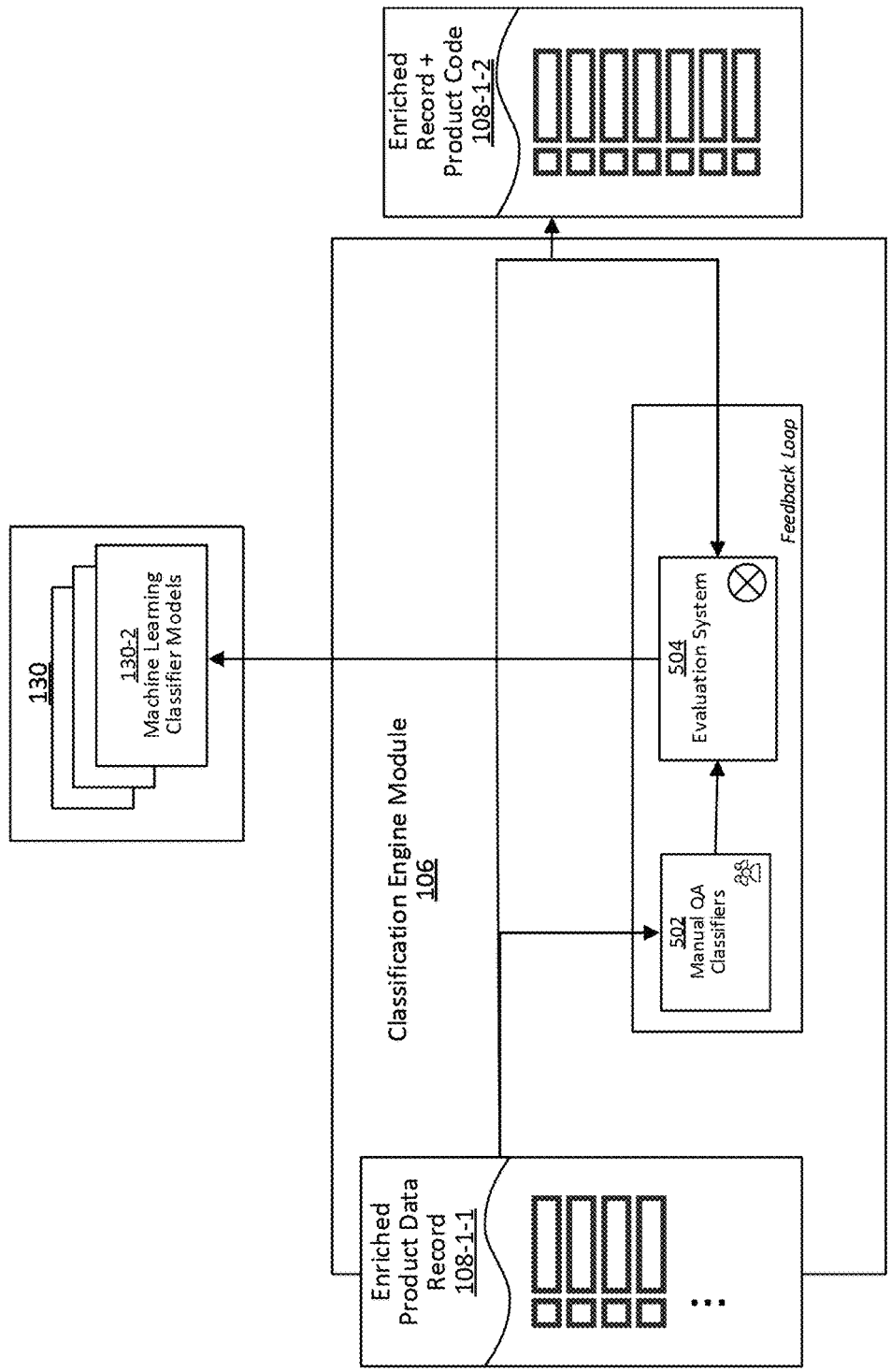
FIG. 5 is an example diagram of one or more embodiments.

As shown in FIG. 5, the classification engine module 106 takes the enriched product data record 108-1-1 as input. The role of the classification engine module 106 is to augment the enriched product data record 108-1-1 with specific classification information that may be required for a compliant transaction. The classification information may be a product code that is on a classification taxonomy, including those such as the Harmonized System (HS) code, Harmonized Tariff System (HTS) code, Export Control Classification Number (ECCN) code, Schedule B code, or United Nations Standard Products and Services Code (UNSPSC). Each of these classification taxonomies are developed and maintained by various governments and international agencies as per their regulatory requirements.

Each of these classification taxonomies are dependent on various pieces of product information, such as material, composition, form, utility, function, as well as a number of other parameters. These parameters may be in the enriched product data record 108-1-1, which is sent to an ensemble 130-2 of ML classifier models which deploy a number of artificial intelligence techniques and algorithms. These include traditional machine learning techniques such as logistic regression, random forests, gradient boosting, as well as modern deep learning techniques, such as convolutional neural networks (CNNs), bi-directional long-short term memory (LSTM) networks and transformer networks. An ensemble model consisting of various individual techniques can also be used to achieve better performance and trade-offs against precision and recall of assigned codes. The ensemble returns a predicted product code and the Predictor updates the enriched product data record 108-1-2.

In addition, the classification engine module 106 may include feedback loop. Selectively sampled input product data records, received by the classification engine module 106, are forwarded for human manual QA classification while also being sent to the ML ensemble 130-2. A human QA classifier thereby provides an independent result by attempting to predict the product code based on a given sampled product data records. This allows for a fair evaluation system to be put in place. By comparing the results of the human classifier and the ML ensemble 130-2, any detected errors by the ML ensemble 130-2 can be quantified and used to iteratively improve ML ensemble 130-2 performance through methods such as reinforcement learning. The whole feedback loop ensures that the ML ensemble 130-2 can be kept relevant over time and responsive to variations in classification performance.

Embodiments may be used on a wide variety of computing devices in accordance with the definition of computer and computer system earlier in this patent. Mobile devices such as cellular phones, smart phones, PDAs, and tablets may implement the functionality described in this patent.

Figure 6:
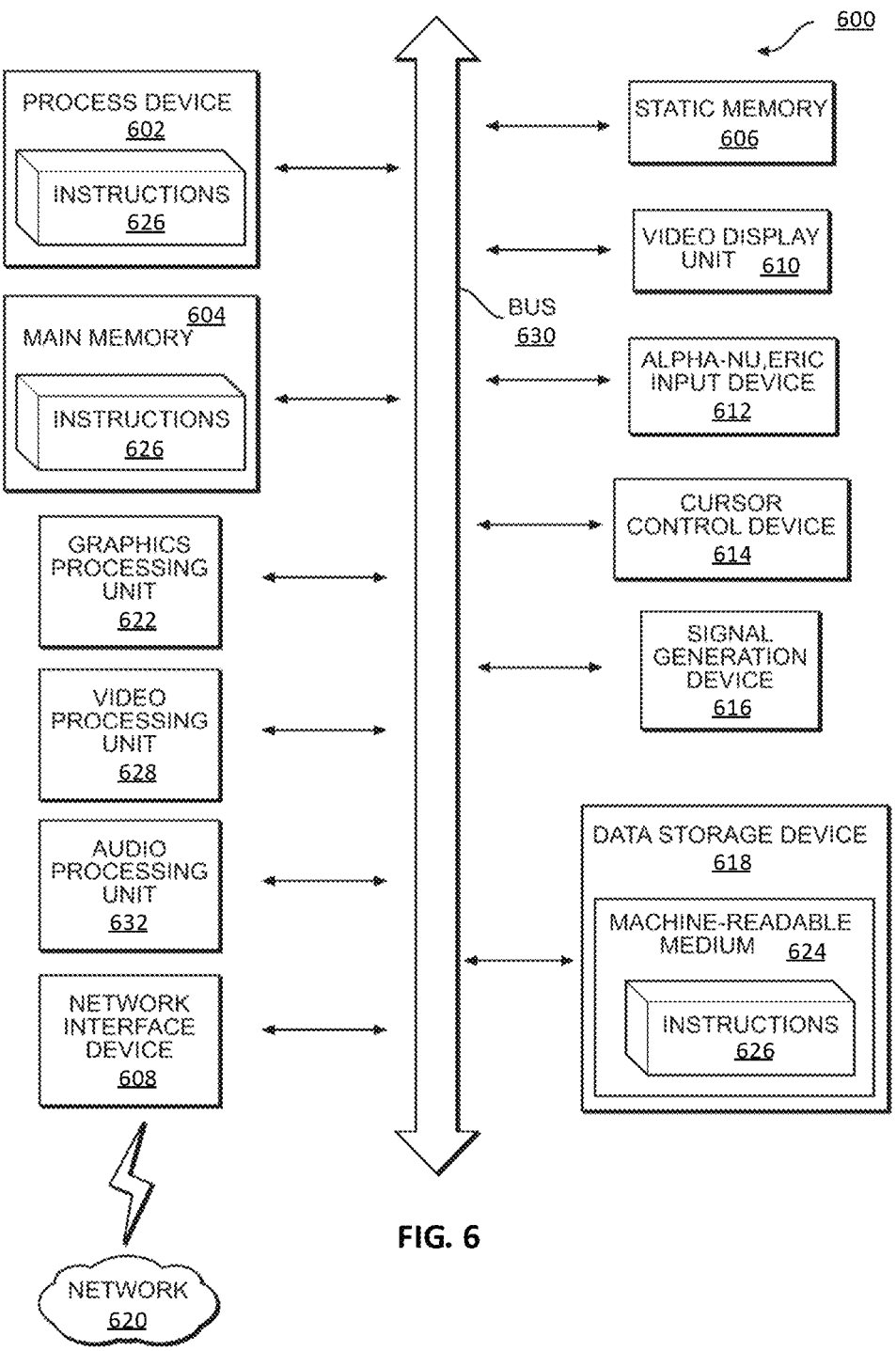
FIG. 6 is an example diagram of one environment in which some embodiments may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) or an input touch device, a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Figure 7A:
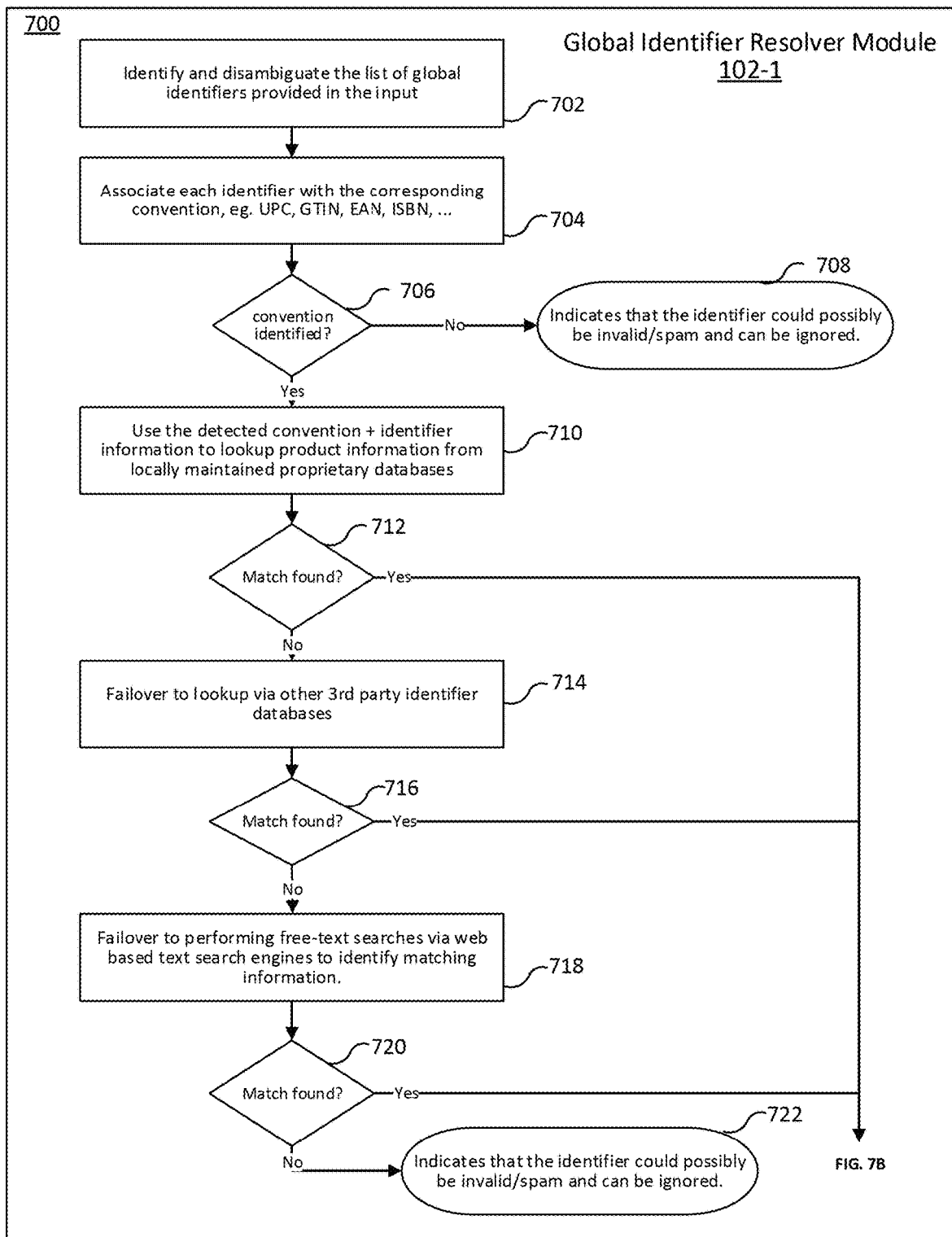
FIGS. 7A and 7B illustrate example methods of one or more embodiments.
Figure 7B:
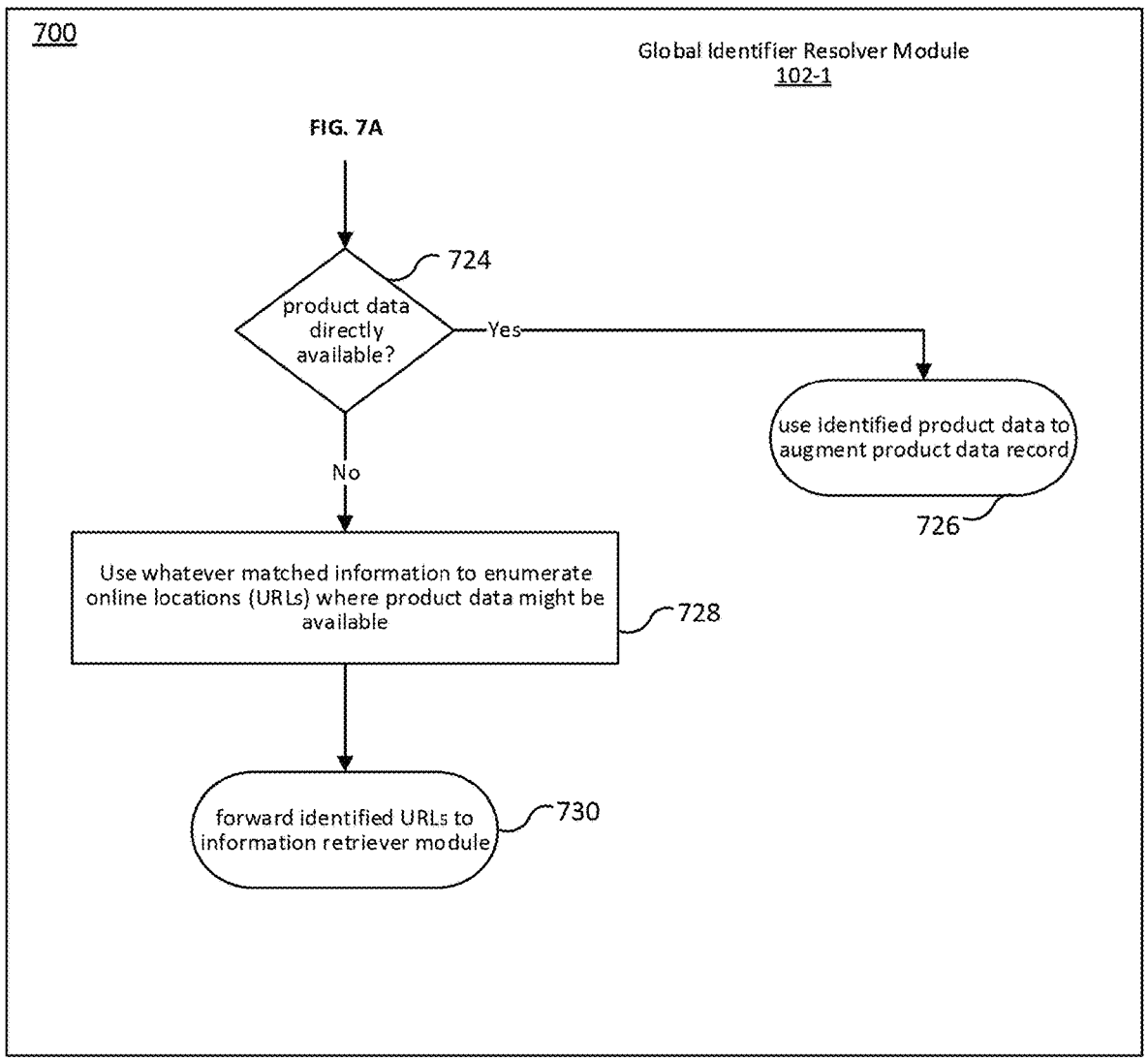

In example method 700, as shown in FIG. 7A, the global identifier resolver module 102-1 identifies and disambiguates a list of global identifiers in the product input data 300 (Act 702). The global identifier resolver module 102-1 associates each respective identifier with a corresponding formatting convention (Act 704). The global identifier resolver module 102-1 determines whether a convention(s) has been identified (Act 706). If a convention(s) has not been identified, the global identifier resolver module 102-1 indicates that the respective identifier is spam and, for example, can be discarded or ignored (Act 708). If a convention(s) has been identified, the global identifier resolver module 102-1 uses the detected formatting convention and the respective identifier to lookup product information in one or more locally maintained proprietary databases (Act 710). The global identifier resolver module 102-1 determines whether there is product information that matches with the detected formatting convention and the respective identifier (Act 712). If a match has been found, the global identifier resolver module 102-1 performs additional steps as shown in FIG. 7B. However, if a match has not been found, the global identifier resolver module 102-1 performs one or more free-text online searches in order to obtain one or more search results with returned product information that matches with the detected convention and the respective identifier (Act 714). The global identifier resolver module 102-1 determines whether there is product information returned in the search results that matches with the detected formatting convention and the respective identifier (Act 716). If no match is found in the search results, then the global identifier resolver module 102-1 indicates that the respective identifier is spam and, for example, can be discarded or ignored (Act 722). However, if a match has been found in the search results, the global identifier resolver module 102-1 performs additional steps as shown in FIG. 7B.

Continuing from FIG. 7A, as shown in FIG. 7B, the global identifier resolver module 102-1 determines whether product data is directly available in the matching product information in proprietary databases or in the received search results (Act 724). If product data is available, the global identifier resolver module 102-1 augments the product data record 108-1 with the product data (Act 726). However, if product data is not available in the matching product information, the global identifier resolver module 102-1 identifies one or more online locations (URLs) based on the matching product information and forwards the identified online location(s) to the information retriever module 102-3.

Figure 8:
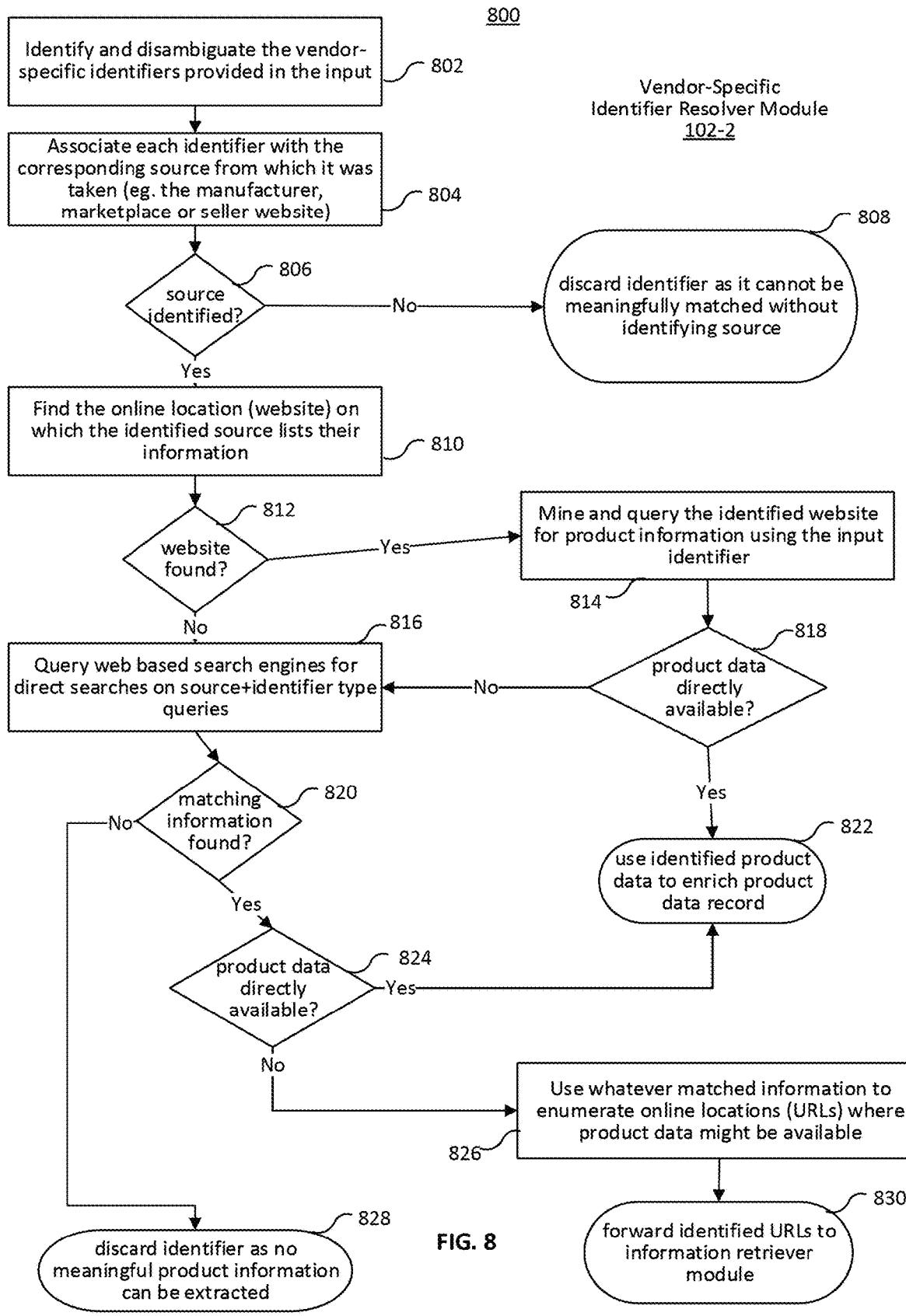
FIG. 8 illustrate an example method of one or more embodiments.

In example method 800, as shown in FIG. 8, the vendor-specific identifier resolver module 102-2 identifies and disambiguates vendor-specific identifiers provided in the product input data 300 (Act 802). The vendor-specific identifier resolver module 102-2 associates each vendor-specific identifier with a corresponding source, such as, for example, a manufacture, marketplace or seller website (Act 804). If a source cannot be identified for a respective vendor-specific identifier (Act 806), the vendor-specific identifier resolver module 102-2 discards the respective vendor-specific identifier. (Act 808). However, if a source can be identified for a respective vendor-specific identifier (Act 806), the vendor-specific identifier resolver module 102-2 finds an online location(s) (such as a website) to obtain additional information from the identified source (Act 810). If a website is found (Act 812), the vendor-specific identifier resolver module 102-2 accesses, mines and queries the website for additional product information using the respective vendor-specific identifier (Act 814). If product data is available from the website (Act 818), the vendor-specific identifier resolver module 102-2 augments the product data record 108-1 with the available product data (Act 822).

If a website is not found (Act 812) or if product data is not available from an identified website (Act 818), the vendor-specific identifier resolver module 102-2 submits queries based on the identified source and the respective vendor-specific identifier to one or more online search engines (Act 816). The vendor-specific identifier resolver module 102-2 determines whether there is product information returned in the search results that matches the identified source and the respective vendor-specific identifier (Act 820). If there is no match, the vendor-specific identifier resolver module 102-2 discards the respective vendor-specific identifier (Act 828). However, if product data is available in a matching search result(s) (Act 824), the vendor-specific identifier resolver module 102-2 enriches (or augments) the product data record 108-1 with the available product data (Act 822). However, if product data is not available in the matching search results (Act 824), the vendor-specific identifier resolver module 102-2 identifies one or more online locations (URLs) based on the matching search results (Act 826) and forwards the identified online location(s) to the information retriever module 102-3 (Act 830).

Figure 9:
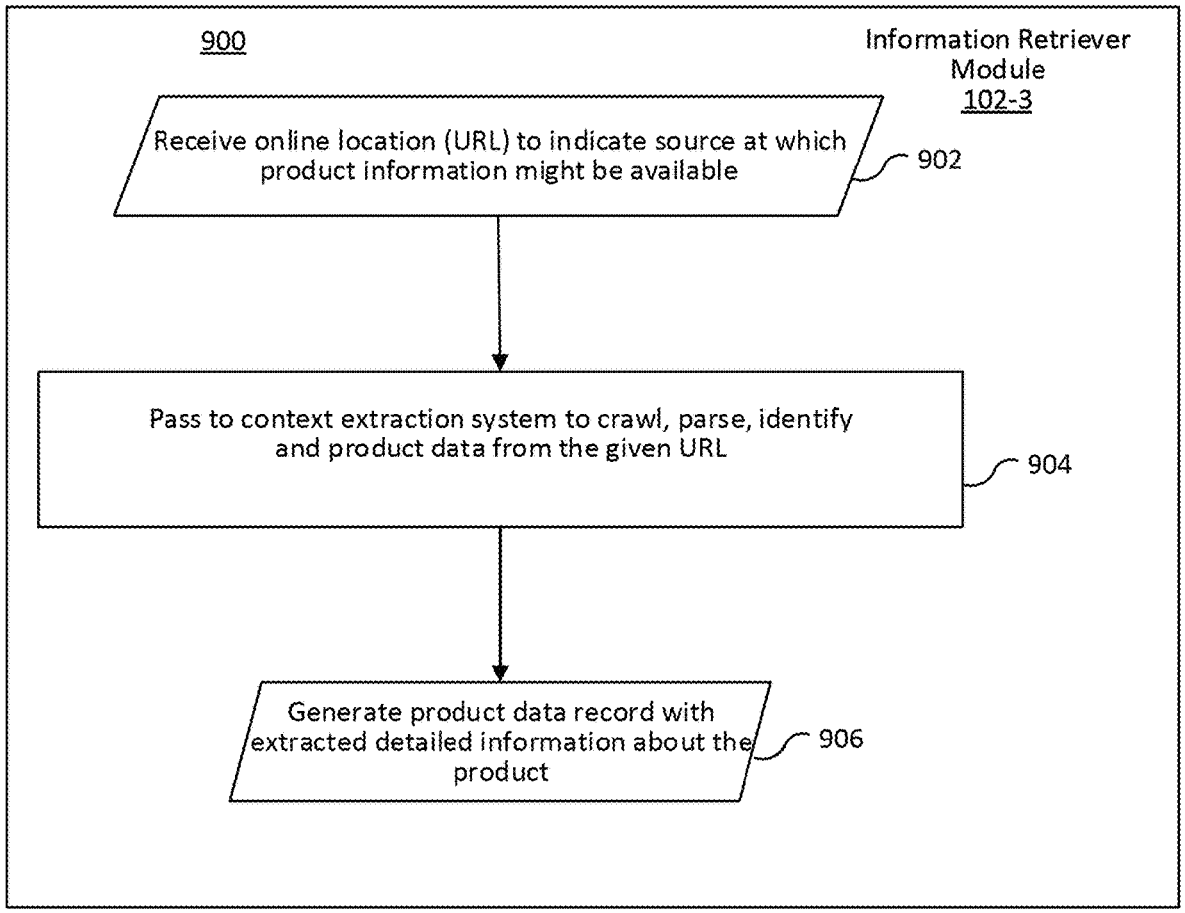
FIG. 9 illustrate an example method of one or more embodiments.

In example method 900, as shown in FIG. 9, the information retriever module 102-3 receives one or more identified online locations (Act 902) which are passed to a content extraction system as described by U.S. patent application Ser. No. 16/288,059 (Act 904). The information retriever module 102-3 receives formatted, extracted product data from the content extraction system and generates a product data record 108-1 with the received formatted, extracted product data (Act 906).

Figure 10:
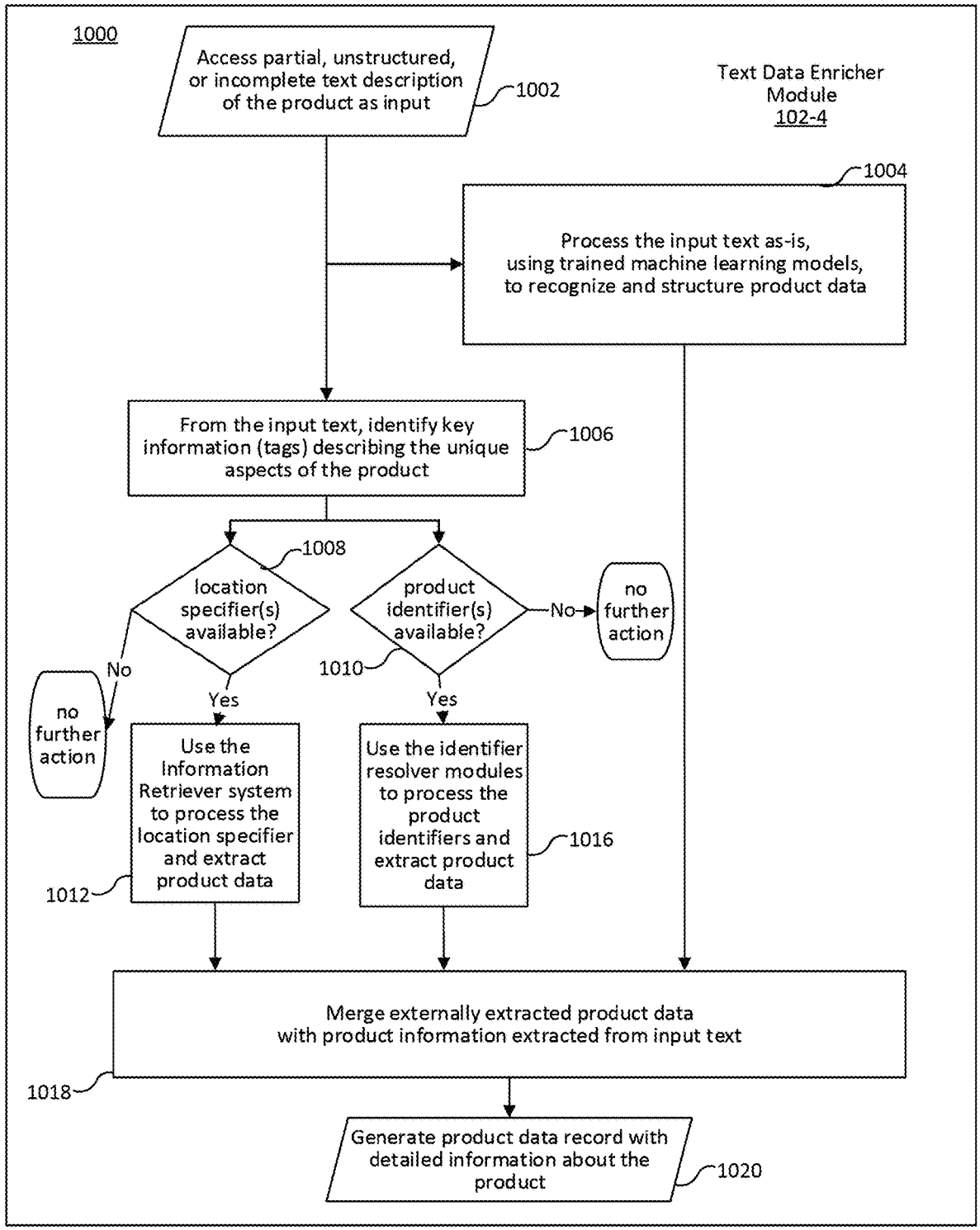
FIG. 10 illustrate an example method of one or more embodiments.

In example method 1000, as shown in FIG. 10, the text data enricher module 102-4 accesses partial, unstructured text (or incomplete textual product description) in the product input data 300 (Act 1002). The text data enricher module 102-4 sends the unstructured text to the machine learning network 130 in order to receive machine learning output that includes estimated/predicted product information (Act 1004). The text data enricher module 102-4 also identifies one or more tags in the unstructured text of the product input data 300 that describe various product aspects (Act 1006). If one or more location specifiers are available in an identified tag (Act 1008), the text data enricher module 102-4 passes the locations specifiers to the information retriever module 102-3 which returns extracted product data (Act 1012). If location specifiers are not available in the identified tags (Act 1008), no further steps are performed by the text data enricher module 102-4 with respect to the particular, identified tag(s). If one or more product identifiers are available in an identified tag(s) (Act 1010), the text data enricher module 102-4 passes the identifiers to the resolver modules 102-1, 102-2 which return extracted product data (Act 1016). If identifiers are not available in the identified tags (Act 1010), no further steps are performed by the text data enricher module 102-4 with respect to the particular, identified tag(s). The text data enricher module 102-4 merges received extracted product data with predicted product information from the machine learning network 130 (Act 1018) and generates a product data record with merged data (Act 1020).

Figure 11:
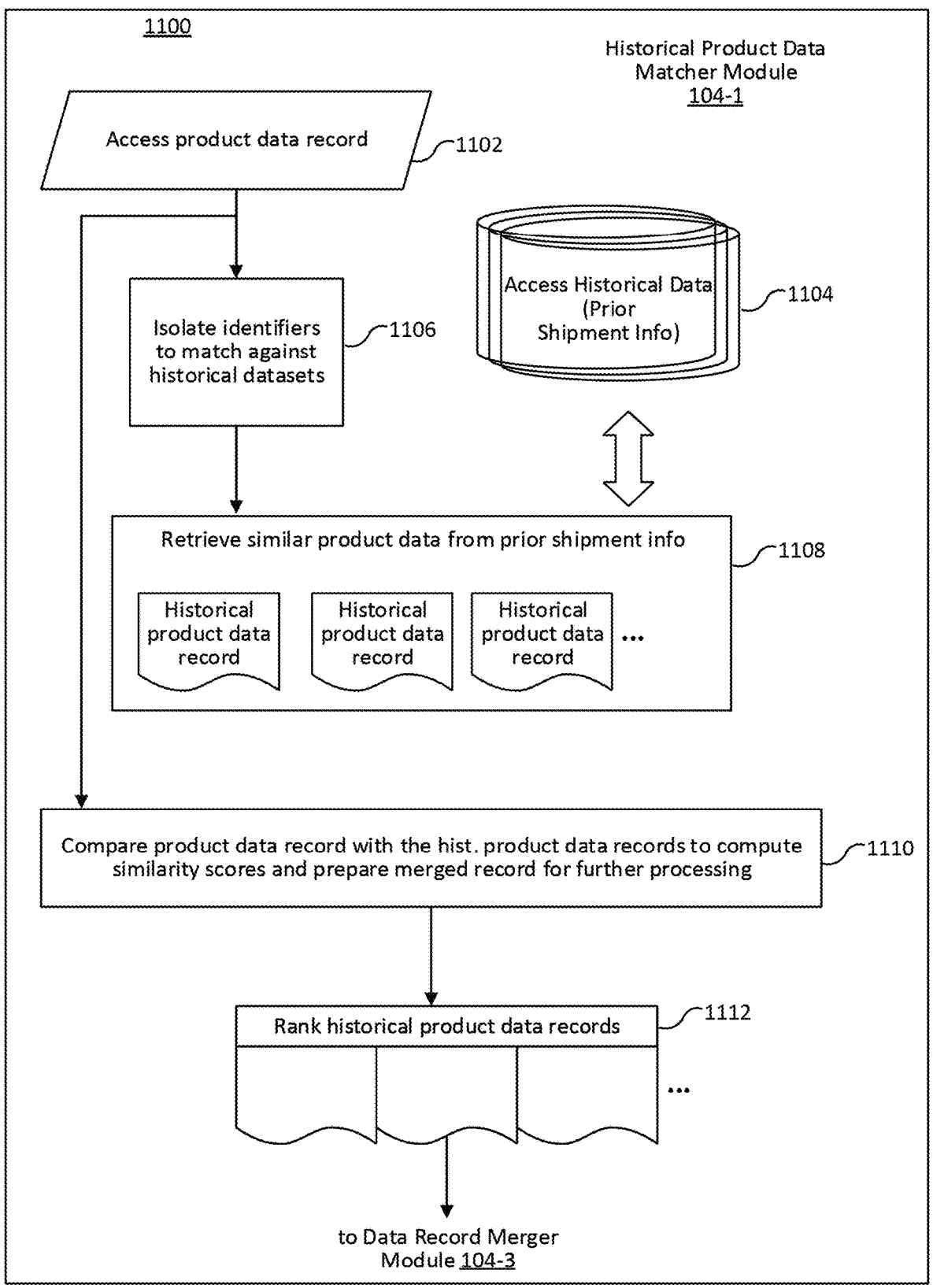
FIG. 11 illustrate an example method of one or more embodiments.

In example method 1100, as shown in FIG. 11, the historical product data matcher module 104-1 accesses the product data record 108-1 (Act 1102) and prior shipment information (Act 1104) in the historical data 124. The historical product data matcher module 104-1 isolates one or more identifiers from the product data record for use in retrieving similar product data in the prior shipment information, as described in one or more historical product data records in the historical data 124 (Act 1108). The historical product data matcher module 104-1 compares the product data record 108-1 with the historical product data records in order to calculate corresponding similarity scores (Act 1110). The historical product data matcher module 104-1 ranks the historical product data records according to the similarity scores (Act 1112) and passes the ranking to the data record merger module 104-3.

Figure 12:
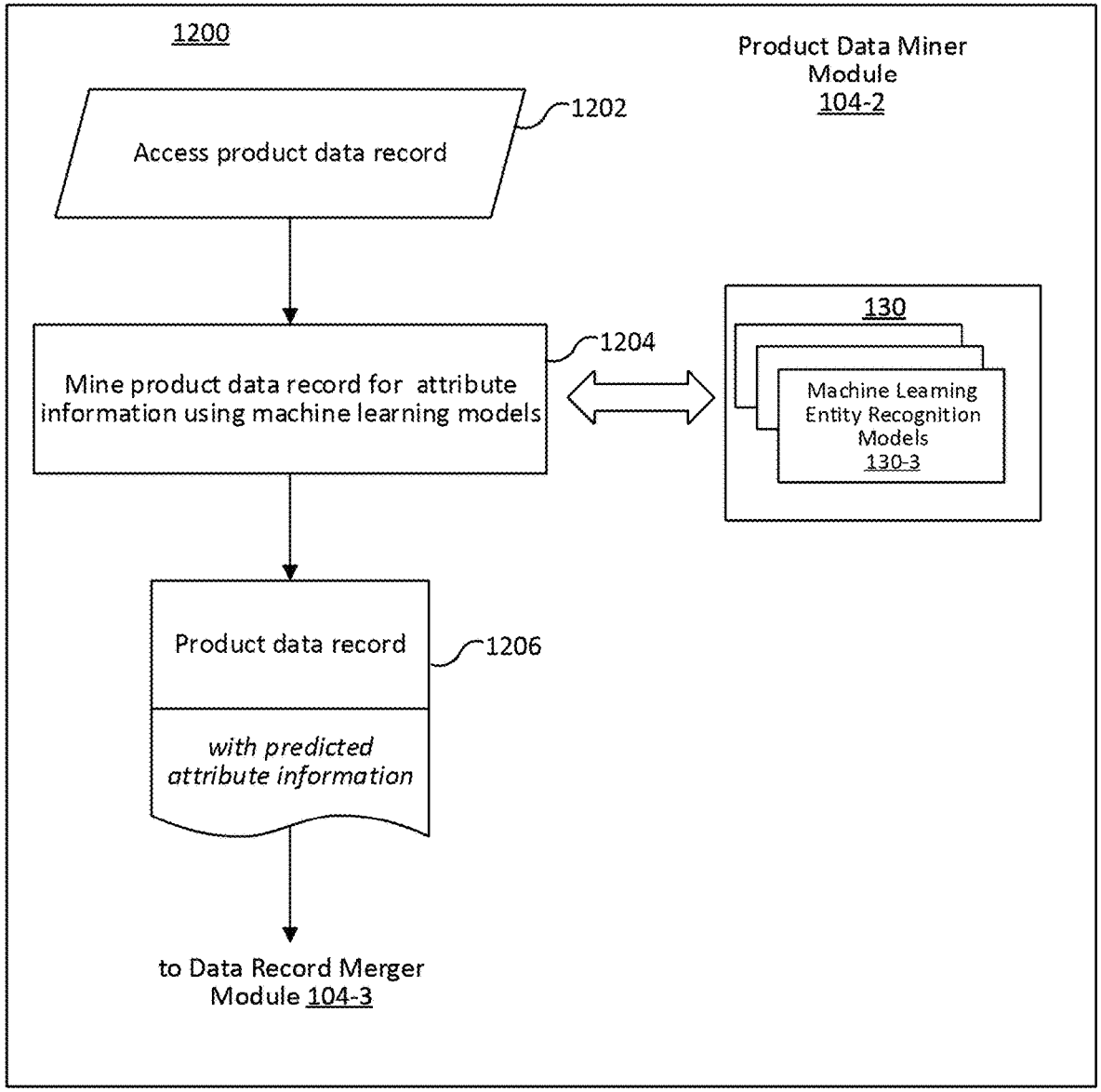
FIG. 12 illustrate an example method of one or more embodiments.

In example method 1200, as shown in FIG. 12, the product data miner module 104-2 accesses the product data record 108-1 (Act 1202), and mines the product data record 108-1 for attribute information via execution of one or more machine learning entity recognition models 130-3 provided by the machine learning network 130 (Act 1204). The product data miner module 104-2 sends the attribute information predicted in output from the machine learning entity recognition models 130-3 to the data record merger module 104-3 (Act 1206).

Figure 13:
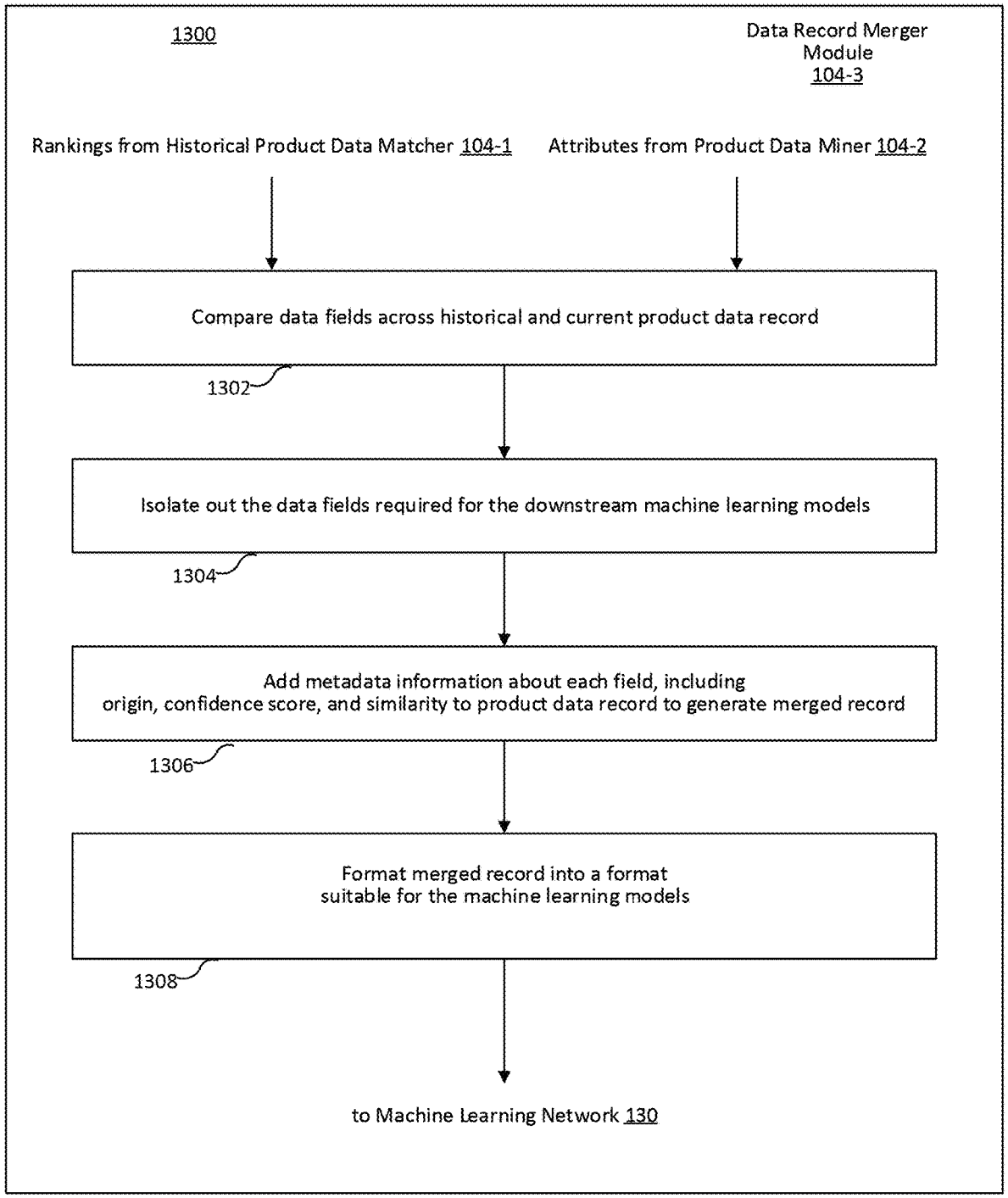
FIG. 13 illustrate an example method of one or more embodiments.

In example method 1300, as shown in FIG. 13, the data record merger module 104-3 receives the ranking of historical product data records from the historical product data matcher module 104-1 and the predicted attribute information from the product data miner module 104-2. The data record merger module 104-3 compares one or more data fields across the ranked historical product data records and the product data record 108-1 (Act 1302). The product data miner module 104-2 isolates one or more data fields required for downstream machine learning models (Act 1304) and adds metadata information about each isolated field into the product data record 108-1 to generate a merged record (Act 1306). The product data miner module 104-2 formats the merged record into a format suitable for processing by one or more machine learning models (Act 1308). Output from machine learning processing of the merged record may further include one or more required ML parameters and estimated data values to be added to the product data record 108-1 in order to generate an enriched product data record 108-1-1 to input for the classification engine module 106.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method for inferring information about a product, comprising:
    determining a formatting convention that input data is structured in accordance with, wherein the input data is related to a shippable product;
    determining a source for retrieving at least one product data attribute related to the shippable product based on the determined formatting convention;
    retrieving the at least one product data attribute from the determined source;
    augmenting the input data with the retrieved at least one product data attribute for a product data record for the shippable product from the determined source;
    ranking historical product data records in historical shipment information for products that satisfy a similarity threshold with the product data record for the shippable product;
    feeding the product data record for the shippable product into one or more machine learning (ML) models to identify at least one predictive attribute that corresponds with identifying accurate product information;
    merging the product data record, the ranked historical product data records and the predictive attribute to generate predictor data;
    formatting the predictor data to align with one or more ML parameters;
    feeding the formatted predictor data into the one or more ML models to estimate additional product data for one or more null fields in the product data record;
    updating the product data record for the shippable product with the predicted additional data to generate an enriched product data record;
    feeding the enriched product data record into an ensemble of the one or more ML models to predict product code data based on one or more commerce classification code taxonomies; and
    adding the predicted product code data to the enriched product data record for the shippable product.

2. The method of claim 1, wherein
    determining a formatting convention that input data is structured in accordance with, wherein the input data is related to a shippable product;
    determining a source for retrieving at least one product data attribute related to the shippable product based on the determined formatting convention; and
    retrieving the at least one product data attribute from the determined source, further comprises:
        determining that a format of at least an identifier portion of the input data corresponds to a global product identification convention;
        searching one or more data sources that includes relevant product data stored in relation to at least one of the identifier portion and the global product identification convention; and
        retrieving the relevant product data.

3. The method of claim 1, wherein
    determining a formatting convention that input data is structured in accordance with, wherein the input data is related to a shippable product;
    determining a source for retrieving at least one product data attribute related to the shippable product based on the determined formatting convention; and
    retrieving the at least one product data attribute from the determined source, further comprises:
        determining that a format of at least an identifier portion of the input data corresponds to a vendor-specific product identification convention;
        searching one or more data sources that identifies an origin of the vendor-specific product identification convention;
        accessing a data location associated with the origin; and
        retrieving relevant product data from at least a portion of the data location that refers to the identifier portion of the input data.

4. The method of claim 1, wherein
    determining a formatting convention that input data is structured in accordance with, wherein the input data is related to a shippable product;
    determining a source for retrieving at least one product data attribute related to the shippable product based on the determined formatting convention; and
    retrieving the at least one product data attribute from the determined source, further comprises:
        determining that a format of at least an identifier portion of the input data identifies a data location;
        accessing the data location; and
        extracting product data from the data location.

5. The method of claim 1, wherein
    determining a formatting convention that input data is structured in accordance with, wherein the input data is related to a shippable product;

determining a source for retrieving at least one product data attribute related to the shippable product based on the determined formatting convention; and retrieving the at least one product data attribute from the determined source, further comprises:

determining that a format of at least a portion of the input data corresponds to uncategorized user-generated text describing the product; and performing a search to identify relevant product data in one or more data sources that includes one or more text instances that matches the user-generated text; and retrieving the relevant product data.

6. The method of claim 1, wherein ranking historical product data records in historical shipment information comprises:

generating at least one product identifier based on the augmented product data record;

accessing historical shipment information to identify historical product data records that include one or more fields that match the product identifier; calculating a respective similarity score for each identify historical product data record with respect to the augmented product data record; and ranking the identified historical product data records according to the respective similarity scores.

7. The method of claim 1, wherein feeding the product data record into one or more ML models to identify at least one predictive attribute comprises:

feeding the augmented product data record into an ML model trained for named entity recognition (NER) to identify the predictive attribute.

8. The method of claim 1, wherein merging the product data record, the ranked historical product data records and the predictive attribute to generate predictor data comprises:

creating a merged record by combining the augmented product data record, the ranked historical product data records and the predictive attribute; and formatting the merged record to correspond with one or more defined ML input parameters, wherein the ML input parameters comprise at least:

i) a respective source metadata for the data in one or more fields (field data) of the merged record;

ii) a respective confidence score corresponding to an accuracy of the field data; and iii) a record similarity score based on a comparison of the merged record and the input data.

9. The method of claim 8, wherein feeding the formatted predictor data into the one or more ML models to estimate additional product data for one or more null fields in the product data record comprises:

feeding the formatted, merged record into the one or more ML models, the one or more ML models trained for one or more of: NER, classification, and regression.

10. The method of claim 1, wherein the ensemble of the one or more ML models includes at least one model based on: logistic regression, random forests, gradient boosting, convolutional neural networks, bi-directional long-short term memory networks and transformer networks.

11. A computer-implemented method for inferring information about a product, comprising:

feeding a product data record corresponding to at least a first product into one or more machine learning (ML) models to identify at least one predictive attribute that corresponds to product information not included in the product data record, wherein the predictive attribute corresponds to product data needed to ship the first product to a first destination;

feeding the product data record and the predictive attribute, corresponding to product data needed to ship the first product to the first destination, into the one or more machine learning models to estimate additional data for one or more null fields in the product data record, wherein the null fields correspond to data needed to generate compliant shipping information, and wherein the additional data comprises data needed to generate compliant shipping information;

updating the product data record with the estimated additional data comprising data needed to generate compliant shipping information; and predicting product code data by feeding the updated product data record including the data needed to generate compliant shipping information, into an ensemble of one or more ML models, the product code data based on one or more commerce classification code taxonomies.

12. The computer-implemented method of claim 11, wherein feeding a product data record, corresponding to at least the first product, into one or more ML models comprises:

feeding the product data record, corresponding to at least the first product, into an ML model trained for named entity recognition (NER) to identify the predictive attribute corresponding to product data needed to ship the first product to the first destination;

wherein the one or more machine learning models to estimate additional data comprise:

one or more ML models trained for one or more of: NER, classification, and regression; and wherein the ensemble of the one or more ML models includes at least one model based on: logistic regression, random forests, gradient boosting, convolutional neural networks, bi-directional long-short term memory networks and transformer networks.

13. The computer-implemented method of claim 12, wherein the product code data is based on one or more commerce classification code taxonomies comprising one of more of the following:

Harmonized System (HS) code,

Harmonized Tariff System (HTS) code,

Export Control Classification Number (ECCN) code,

Schedule B code, and/or

United Nations Standard Products and Services Code (UNSPSC).

14. The computer-implemented method of claim 11, wherein feeding the product data record, corresponding to at least the first product, and the predictive attribute, corresponding to product data needed to ship the first product to the first destination, into the one or more machine learning models to estimate additional data for one or more null fields, corresponding to data needed to generate compliant shipping information, in the product data record comprises:

creating a merged record based on:

the product data record, corresponding to at least the first product, ranked historical product data records with fields similar to the product data record and the predictive attribute, corresponding to product data needed to ship the first product to the first destination; and formatting the merged record to correspond with one or more defined ML input parameters, wherein the ML input parameters comprise at least:

i) a respective source metadata for the data in one or more fields (field data) of the merged record;
ii) a respective confidence score corresponding to an accuracy of the field data; and
iii) a record similarity score based on a comparison of the merged record and the input data.

15. The computer-implemented method of claim 13, further comprising:
prior to creating the merged record: generating at least one product identifier based on the product data record, corresponding to at least the first product; and
accessing historical shipment information to identify the historical product data records of one or more products that include one or more fields that match the product identifier.

16. The computer-implemented method of claim 11, further comprising:
receiving initial input data about the product; retrieving at least one product data attribute based on a formatting convention of the input data; and
augmenting the input data with the retrieved product data attribute for the product data record, corresponding to at least the first product, that is to be fed into the one or more ML models to identify at least one predictive attribute.

17. A system comprising:
one or more processors; and
a non-transitory computer readable medium storing a plurality of instructions, which when executed, cause the one or more processors to:
feed a product data record, corresponding to at least the first product, into one or more machine learning (ML) models to identify at least one predictive attribute that corresponds to product information not included in the product data record,
wherein the predictive attribute corresponds to product data needed to ship the first product to a first destination;
feed the product data record, corresponding to at least the first product, and the predictive attribute, corresponding to product data needed to ship the first product to the first destination, into the one or more machine learning models to estimate additional data for one or more null fields in the product data record, corresponding to at least the first product,
wherein the null fields correspond to data needed to generate compliant shipping information, and
wherein the additional data comprises data needed to generate compliant shipping information;
update the product data record, corresponding to at least the first product, with the estimated additional data comprising data needed to generate compliant shipping information; and
predict product code data by feeding the updated product data record into an ensemble of one or more ML models, the product code data based on one or more commerce classification code taxonomies.

18. The system of claim 17, wherein feed a product data record into one or more ML models comprises:
feed the product data record into an ML model trained for named entity recognition (NER) to identify the predictive attribute, corresponding to product data needed to ship the first product to the first destination;
wherein the one or more machine learning models to estimate additional data comprise:
one or more ML models trained for one or more of: NER, classification, and regression; and
wherein the ensemble of the one or more ML models includes at least one model based on: logistic regression, random forests, gradient boosting, convolutional neural networks, bi-directional long-short term memory networks and transformer networks.

19. The system of claim 18, wherein the product code data is based on one or more commerce classification code taxonomies comprising one of more of the following:
Harmonized System (HS) code,
Harmonized Tariff System (HTS) code,
Export Control Classification Number (ECCN) code,
Schedule B code, and/or
United Nations Standard Products and Services Code (UNSPSC).

20. The system of claim 17, wherein feeding the product data record, corresponding to at least the first product, and the predictive attribute, corresponding to product data needed to ship the first product to the first destination, into the one or more machine learning models to estimate additional data for one or more null fields in the product data record comprises:
create a merged record based on the product data record, corresponding to at least the first product, ranked historical product data records with fields similar to the product and the predictive attribute; and
format the merged record to correspond with one or more defined ML input parameters, wherein the ML input parameters comprise at least:
i) a respective source metadata for the data in one or more fields (field data) of the merged record;
ii) a respective confidence score corresponding to an accuracy of the field data; and
iii) a record similarity score based on a comparison of the merged record and the input data.

21. The system of claim 19, further comprising:
prior to create the merged record: generate at least one product identifier based on the product data record, corresponding to at least the first product; and
access historical shipment information to identify the historical product data records that include one or more fields that match the product identifier.

22. The system of claim 17, further comprising:
receive initial input data about the product; retrieve at least one product data attribute based on a formatting convention of the input data; and
augment the input data with the retrieved product data attribute for the product data record, corresponding to at least the first product, that is to be fed into the one or more ML models to identify at least one predictive attribute.

* * * * *

UNITED STATES PATENT AND TRADEMARK OFFICE
CERTIFICATE OF CORRECTION

PATENT NO. : 11,443,273 B2  
APPLICATION NO. : 16/740301  
DATED : September 13, 2022  
INVENTOR(S) : Ramanan Balakrishnan Page 1 of 1

It is certified that error appears in the above-identified patent and that said Letters Patent is hereby corrected as shown below:

In the Drawings

Sheet 13 of 21, (Reference Numeral 612), (Figure 6), Line 1: Delete "ALPHA-NU,ERIC" and insert -- ALPHA-NUMERIC --.

In the Claims

On Column 20, Line 17: In Claim 11, delete "record" and insert -- record, --.

On Column 20, Lines 42-43: In Claim 13, delete "one of more" and insert -- one or more --.

On Column 22, Line 16 (Approx.): In Claim 19, delete "one of more" and insert -- one or more --.

Signed and Sealed this  
Twenty-seventh Day of December, 2022

Katherine Kelly Vidal  
*Director of the United States Patent and Trademark Office*